United States Patent
Noh et al.

(10) Patent No.: US 12,557,149 B2
(45) Date of Patent: Feb. 17, 2026

(54) METHOD AND APPARATUS FOR TRANSMITTING SIGNAL IN WIRELESS COMMUNICATION SYSTEM

(71) Applicant: WILUS INSTITUTE OF STANDARDS AND TECHNOLOGY INC., Gyeonggi-do (KR)

(72) Inventors: Minseok Noh, Gyeonggi-do (KR); Geunyoung Seok, Gyeonggi-do (KR); Youngjoon Yoon, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 19/301,836

(22) Filed: Aug. 15, 2025

(65) Prior Publication Data

US 2025/0380313 A1    Dec. 11, 2025

Related U.S. Application Data

(63) Continuation of application No. PCT/KR2024/095414, filed on Feb. 19, 2024.

(30) Foreign Application Priority Data

Feb. 17, 2023    (KR) .................. 10-2023-0021544

(51) Int. Cl.
*H04W 4/00*    (2018.01)
*H04W 72/0446*    (2023.01)
(Continued)

(52) U.S. Cl.
CPC ... *H04W 74/0875* (2013.01); *H04W 72/0446* (2013.01); *H04W 72/25* (2023.01); *H04W 92/18* (2013.01)

(58) Field of Classification Search
CPC ............ H04W 74/0875; H04W 72/25; H04W 72/0446; H04W 92/18; H04W 72/12; H04W 74/00
(Continued)

(56) References Cited

U.S. PATENT DOCUMENTS 10,757,717 B2 *   8/2020   Noh ................. H04L 5/0094
11,546,937 B2 *   1/2023   Cao ................. H04L 1/1887
(Continued)

FOREIGN PATENT DOCUMENTS

WO    2022/152329    7/2022
WO    2024/172636    8/2024

OTHER PUBLICATIONS

International Search Report for PCT/KR2024/095414 mailed on May 24, 2024 and its English translation from WIPO (published as WO2024/172636).
(Continued)

*Primary Examiner* — Marceau Milord
(74) *Attorney, Agent, or Firm* — WOMBLE BOND DICKINSON (US) LLP

(57) ABSTRACT

The present invention relates to a wireless communication system and, specifically, to a method and a wireless device therefor, the method comprising the steps of: for a plurality of SL transmissions within a slot, determining a CAPC value per each SL transmission; and for transmitting the plurality of SL transmissions in the slot, performing a Type 1 CAP on the basis of the highest CAPC value among a plurality of CAPC values associated with the plurality of SL transmissions.

20 Claims, 17 Drawing Sheets

(51) Int. Cl.
*H04W 72/25* (2023.01)
*H04W 74/08* (2009.01)
*H04W 92/18* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 11,595,160 | B2* | 2/2023 | Lee | H04L 1/1614 |
| 11,778,648 | B2* | 10/2023 | Wong | H04W 72/0446 |
| | | | | 370/329 |
| 12,028,267 | B1* | 7/2024 | Mansour | H04W 28/0247 |
| 12,096,418 | B2* | 9/2024 | Hosseini | H04L 27/2607 |
| 12,295,035 | B2 | 5/2025 | Sun et al. | |
| 12,302,394 | B2 | 5/2025 | Huang et al. | |
| 2013/0250881 | A1* | 9/2013 | Liao | H04L 1/1812 |
| | | | | 370/329 |
| 2014/0307638 | A1* | 10/2014 | Zacharias | H04W 72/541 |
| | | | | 370/329 |
| 2018/0206269 | A1* | 7/2018 | Bhorkar | H04L 5/0094 |
| 2021/0320759 | A1* | 10/2021 | Lee | H04L 1/1896 |
| 2022/0312465 | A1* | 9/2022 | He | H04L 5/0092 |
| 2022/0369344 | A1 | 11/2022 | Liu et al. | |
| 2023/0008259 | A1 | 1/2023 | Xue et al. | |
| 2023/0030664 | A1* | 2/2023 | Zhang | H04L 5/0078 |
| 2023/0055878 | A1* | 2/2023 | Ryu | H04B 7/0617 |
| 2023/0128447 | A1* | 4/2023 | Elshafie | H04W 72/542 |
| | | | | 370/329 |
| 2023/0199431 | A1* | 6/2023 | Gune | H04W 72/1263 |
| | | | | 455/456.1 |

OTHER PUBLICATIONS

Written Opinion of the International Searching Authority for PCT/KR2024/095414 mailed on May 24, 2024 and its English translation by Google Translate (published as WO2024/172636).

Nokia, Nokia Shanghai Bell: "On Channel Access Mechanism for SL-U", 3GPP TSG RAN WG1 #111, R1-2210827, Toulouse, France, Nov. 7, 2022, pp. 1-16.

LG Electronics Inc.: "Discussion on RAN2 aspects in SL-U", 3GPP TSG-RAN WG2 Meeting #120, R2-2211640, Toulouse Meeting, Nov. 4, 2022, pp. 1-9.

* cited by examiner

METHOD AND APPARATUS FOR TRANSMITTING SIGNAL IN WIRELESS COMMUNICATION SYSTEM

This application is a continuation of International Patent Application No. PCT/KR2024/095414 filed on Feb. 19, 2024, which claims the priority to Korean Patent Application No. 10-2023-0021544 filed in the Korean Intellectual Property Office on Feb. 17, 2023, the entire contents of which are incorporated herein by reference.

TECHNICAL FIELD

The present invention relates to a wireless communication system. Specifically, the present invention relates to a channel access method and a device using the same in a wireless communication system.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (COMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

A sidelink (SL) refers to a communication scheme in which a direct link is established between user equipments (UEs), and the UEs exchange voice or data directly with each other without intervention of a base station (BS). SL is considered as a solution of relieving the burden of the base station due to the rapidly increasing data traffic.

Vehicle-to-everything (V2X) refers to a communication technology that exchanges information with other vehicles, pedestrians, and infrastructure-built objects through wired/wireless communication. V2X may be divided into four types such as, vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more communication devices require larger communication capacities, there is a need for mobile broadband communication improved from the legacy radio access technology (RAT). Accordingly, communication systems considering services or UEs sensitive to reliability and latency are under discussion. A next-generation radio access technology in consideration of enhanced mobile broadband communication, massive MTC, ultra-reliable and low latency communication (URLLC), etc. may be referred to as new radio access technology (RAT) or new radio (NR). Even in NR, vehicle-to-everything (V2X) communication may be supported.

Meanwhile, in case of SL communications involving services with high reliability requirements or services with relatively high reliability requirements, for example, the SL HARQ feedback operation and/or mechanism of the UE may be useful.

DISCLOSURE OF INVENTION

Technical Problem

The disclosure is to provide a method for efficiently transmitting a signal in a wireless communication system and a device using the same. Specifically, the disclosure is to provide a channel access method for efficiently performing transmission in a wireless communication system and a device using the same.

Solution to Problem

In an aspect of the disclosure, a user equipment (UE) used in a wireless communication system includes a communication module; and a processor controlling the communication module, wherein the processor is configured to determine each channel access priority class (CAPC) value for each SL transmission for a plurality of sidelink (SL) transmissions within a slot, and perform a Type 1 channel access procedure (CAP) based on the highest CAPC value among a plurality of CAPC values associated with the plurality of SL transmissions for transmitting the plurality of SL transmissions in the slot.

In another aspect of the disclosure, a method used by a user equipment (UE) in a wireless communication system is provided including determining each channel access priority class (CAPC) value for each SL transmission for a plurality of sidelink (SL) transmissions within a slot; and performing a Type 1 channel access procedure (CAP) based on the highest CAPC value among a plurality of CAPC values associated with the plurality of SL transmissions for transmitting the plurality of SL transmissions in the slot.

Preferably, the plurality of CAPC values may be associated with each contention window (CW) parameter, and the higher the CAPC value, the lower the channel access priority of the CW parameter.

Preferably, when the Type 1 CAP is successful, the plurality of SL transmissions may be transmitted to each corresponding receiving UE.

Preferably, the plurality of SL transmissions may correspond to two or more receiving UEs.

Preferably, the plurality of SL transmissions may be scheduled to be transmitted on the same time resources within the slot.

Preferably, the plurality of SL transmissions may be scheduled to be transmitted on different frequency resources within the slot.

Preferably, the plurality of SL transmissions may include a physical sidelink feedback channel (PSFCH) transmission.

Preferably, the plurality of SL transmissions may include a plurality of PSFCH transmissions.

Preferably, the CAPC value associated with the PSFCH transmission may be determined based on the traffic priority of the physical sidelink shared channel (PSSCH) corresponding to the PSFCH transmission.

Preferably, the traffic priority may be determined based on the priority information within a sidelink control information (SCI) that schedules the PSSCH.

Advantageous Effects of Invention

The disclosure provides a method for efficiently transmitting a signal in a wireless communication system and a device using the same. In addition, the disclosure provides a channel access method for efficiently performing transmission in a wireless communication system and a device using the same.

The effects obtainable from the disclosure are not limited to the effects mentioned above, and other effects not mentioned will be clearly understood by those skilled in the art to which the disclosure belongs from the description below.

MODE FOR CARRYING OUT THE INVENTION

Figure 1:
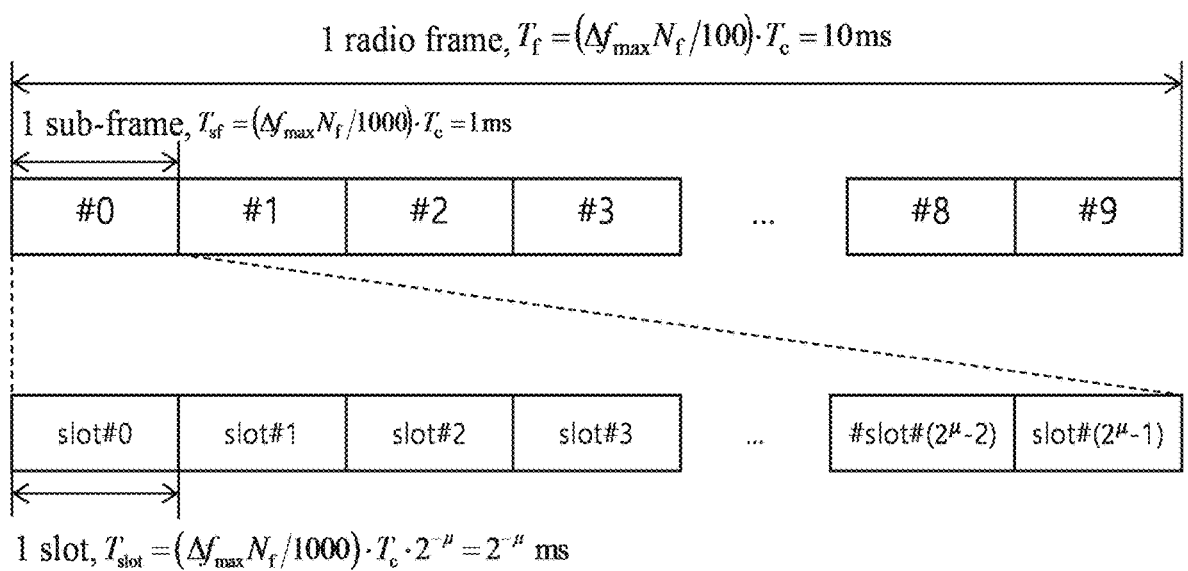
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f / 100) * T_c$). In addition, the wireless frame includes 10 subframes (SFs) having equal sizes. Herein, $\Delta f_{max}=480*103$ Hz, $N_f=4096$, $T_c=1/(\Delta f_{ref}*N_{f,ref})$, $\Delta f_{ref}=15*103$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*24$ kHz, and u can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include 24 slots. In this case, the length of each slot is $2^{-\mu}$ ms. Numbers from 0 to $2^\mu-1$ may be respectively allocated to $2^\mu$ slots within one wireless frame.

In addition, numbers from 0 to 10*24-1 may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
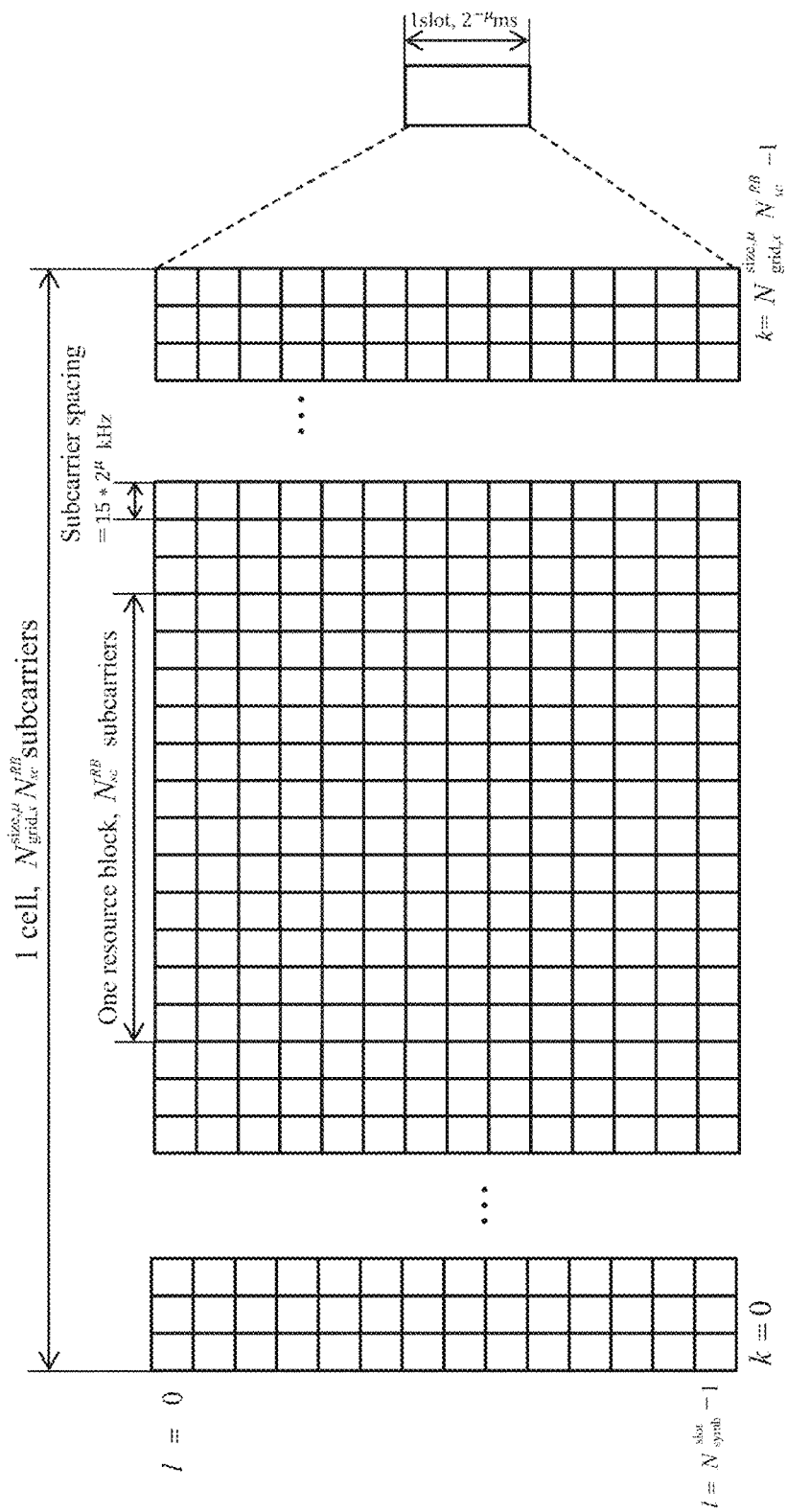
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x} * N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent μ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, 1) in one slot. k may be an index assigned from 0 to $N^{size,\mu}_{grid,x} * N^{RB}_{sc}-1$ in the frequency domain, and 1 may be an index assigned from 0 to $N^{slot}_{symb}-1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal cannot change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

Figure 3:
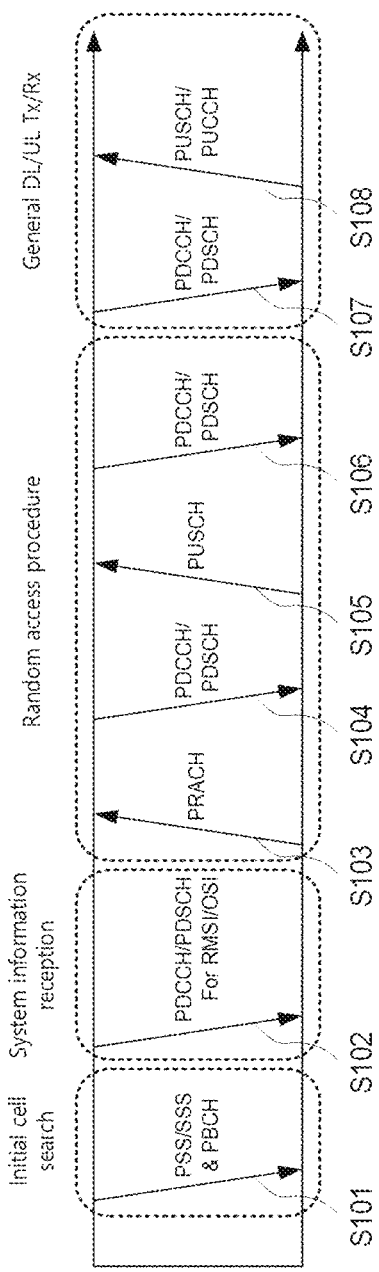
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
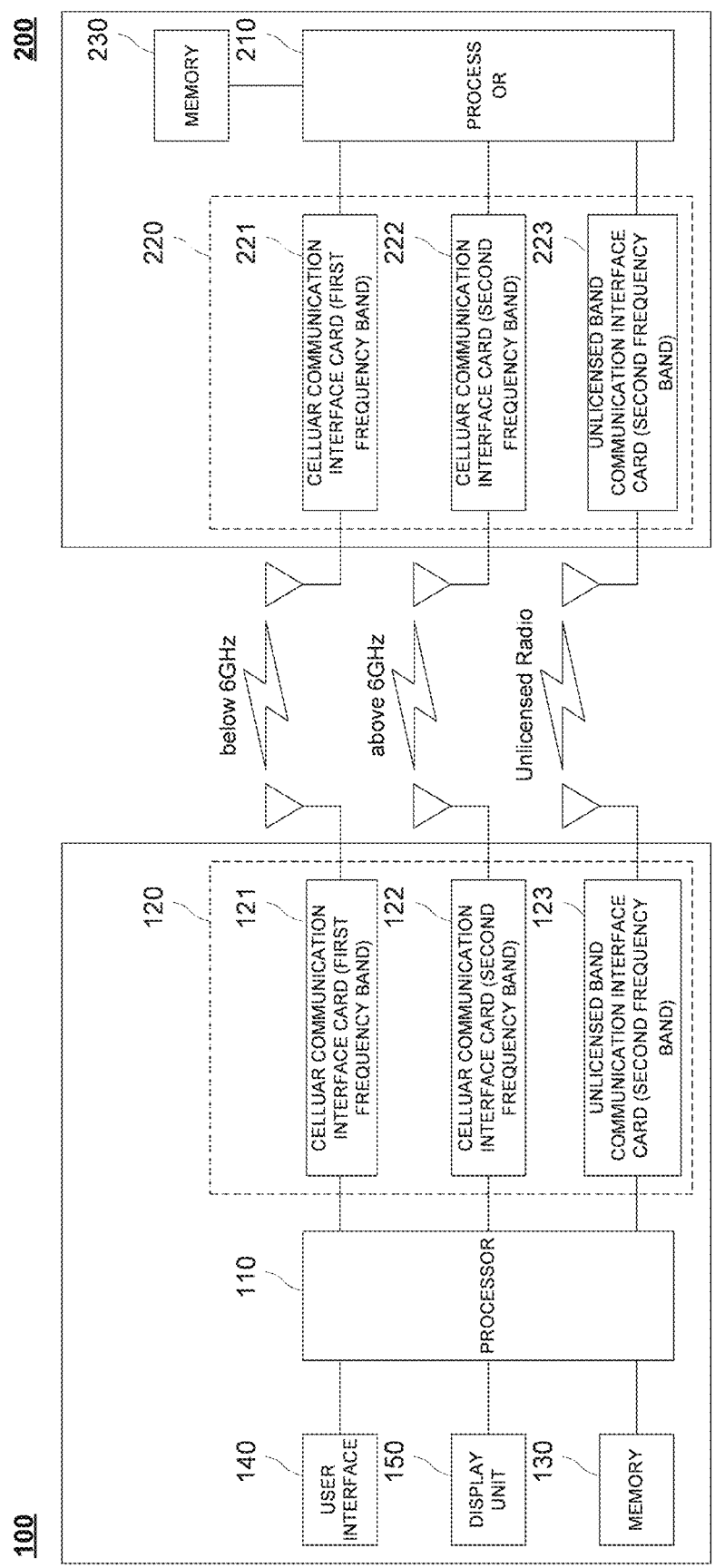
FIG. 4 is a block diagram illustrating configurations of a UE and a base station according to an embodiment of the present invention.

FIG. 4 is a block diagram showing the configurations of a UE and a base station according to an embodiment of the present invention. In an embodiment of the present invention, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present invention, the base station controls and manages a cell (e.g., a macro cell, a femto cell, a pico cell, etc.) corresponding to a service area, and performs functions of a signal transmission, a channel designation, a channel monitoring, a self-diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHZ, 6 GHZ, 7 GHz or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present invention may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present invention. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHZ. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the UE 100, an external device, and a server in accordance with the cellular communication standards or protocols in the frequency bands 6 GHz or more supported by the corresponding NIC module.

The unlicensed band communication interface card 223 transmits or receives a radio signal with at least one of the UE 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHZ, 6 GHZ, 7 GHz or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 4 is a block diagram illustrating the UE 100 and the base station 200 according to an embodiment of the present invention, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

<Sidelink (SL) Communication>

SL communication refers to a communication method that enables UEs to establish a direct link and to directly exchange voice or data without going through a base station. In SL communication, the base station of FIG. 4 may be replaced with a UE. SL communication may be interchangeable with vehicle-to-everything (V2X) communication.

Figure 5:
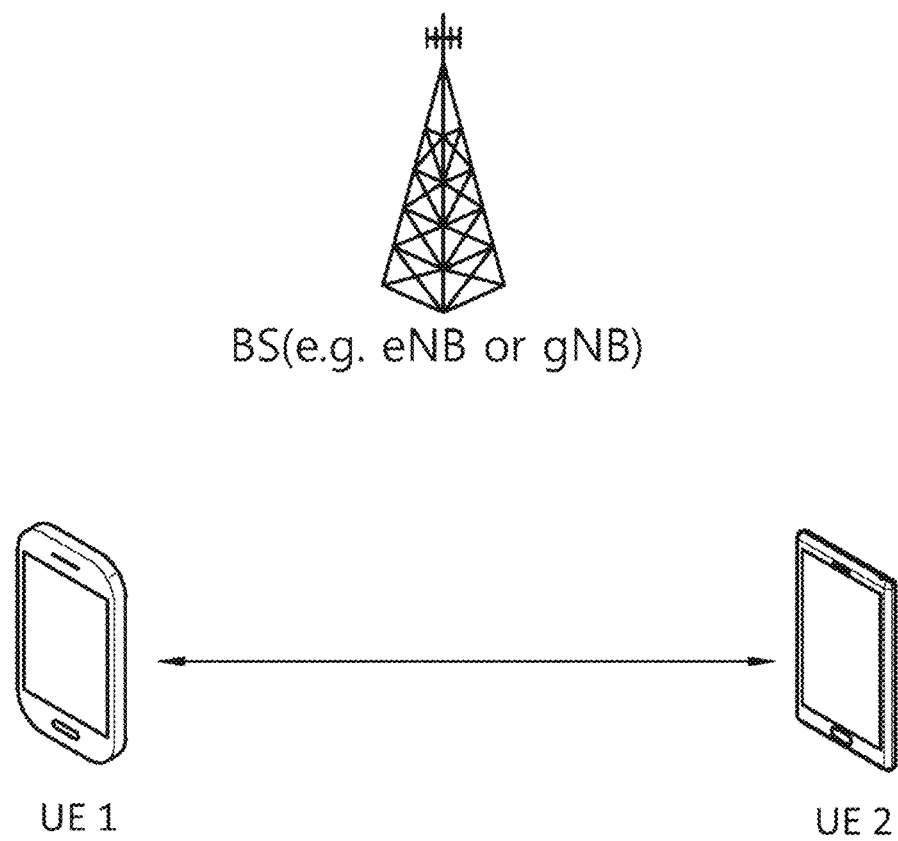
FIGS. 5 to 12 illustrate examples of a sidelink (SL) communication process.

FIG. 5 illustrates an example of a UE and a base station for performing V2X or SL communication.

Referring to FIG. 5, in V2X/SL communication, the term "UE" may mostly refer to a UE of a user. However, when a network device, such as a base station, transmits and receives a signal according to a communication method between UEs, the base station may also be considered as a type of UE.

UE 1 may select a resource unit corresponding to a specific resource from a resource pool that is a set of resources, and may operate to transmit an SL signal by using the resource unit. UE 2, which is a receiving UE, may receive the configuration of the resource pool for UE 1 to transmit a signal, and may detect a signal of UE 1 from the resource pool.

Here, when UE 1 is within the connectivity range of a base station, the base station may report the resource pool. However, when UE 1 is outside the connectivity range of the base station, another UE may report the resource pool, or the resource pool may be determined as a predetermined resource.

Figure 6:
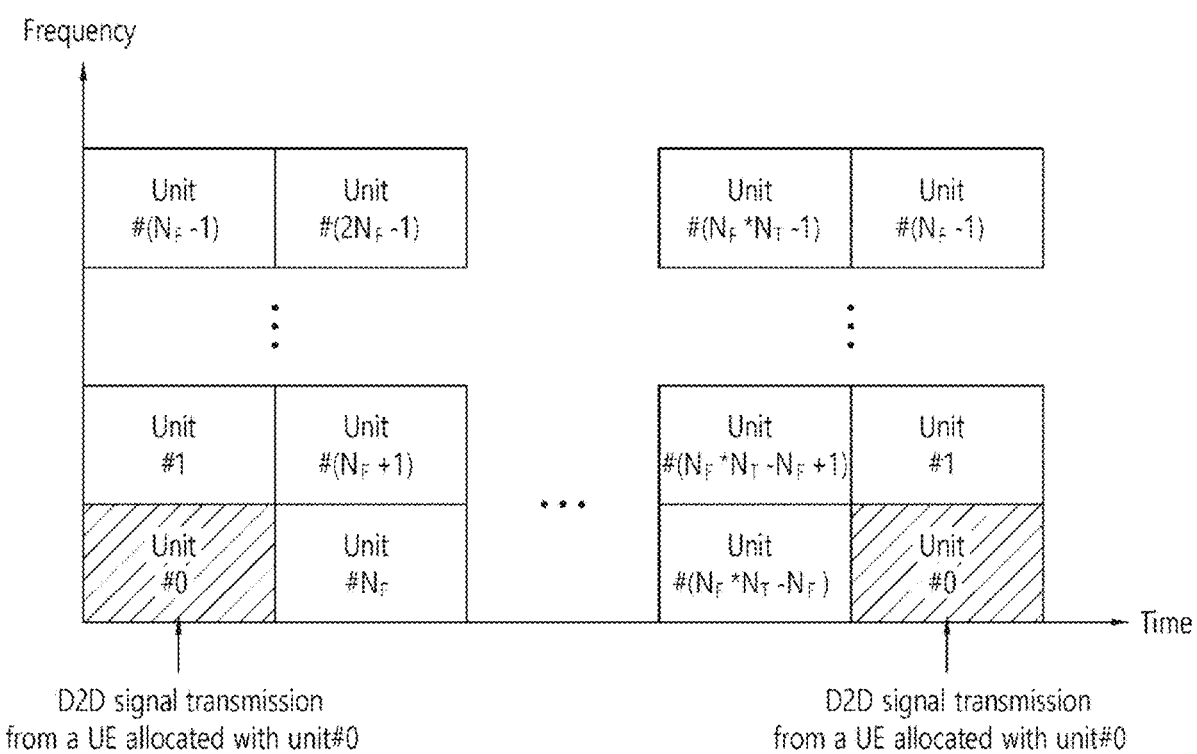

FIG. 6 illustrates an example of a resource unit for V2X or SL communication.

Referring to FIG. 6, a resource pool may include a plurality of resource units, and each UE may select and use one resource unit or a plurality of resource units to transmit an SL signal. All frequency resources of the resource pool may be divided into $N_F$ units, and all time resources of the resource pool may be divided into Nr units. Therefore, a total of $N_F*N_T$ resource units may be defined in the resource pool.

As illustrated in FIG. 6, one resource unit (e.g., Unit #0) may be periodically repeated. Alternatively, to obtain a diversity effect in a time or frequency dimension, the index of a physical resource unit to which one logical resource unit is mapped may change in a predetermined pattern over time. In this structure of resource units, the resource pool may refer to a set of resource units that a UE wanting to transmit an SL signal may use for transmission.

Resource pools may be divided into a plurality of types. For example, resource pools may be classified as follows depending on the content of an SL signal transmitted in each resource pool.

(1) A scheduling assignment (SA) may be a signal including information, such as the position of a resource that a transmitting UE uses to transmit an SL data channel, a modulation and coding scheme (MCS) or a multiple-input multiple-output (MIMO) transmission method required to demodulate other data channels, and timing advance (TA). The SA may also be multiplexed and transmitted with SL data on the same resource unit, in which case an SA resource pool may refer to a resource pool in which the SA is multiplexed and transmitted with the SL data. The SA may also be referred to as an SL control channel.

(2) A SL data channel (physical sidelink shared channel: PSSCH) may be a resource pool used by a transmitting UE to transmit user data. If an SA is multiplexed and transmitted with SL data on the same resource unit, only an SL data channel excluding SA information may be transmitted in a resource pool for the SL data channel. That is, resource elements (REs) used to transmit SA information on an individual resource unit within an SA resource pool may still be used to transmit SL data in the resource pool for the SL data channel.

Hereinafter, resource allocation in an SL will be described.

Figure 7:
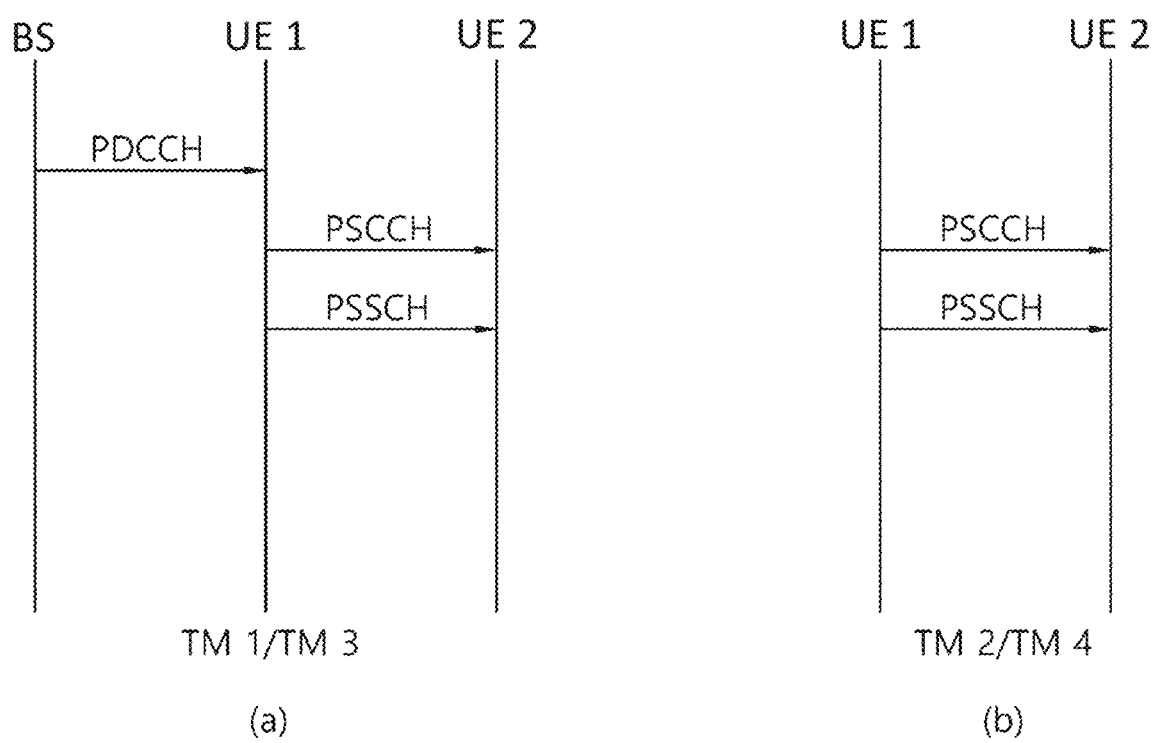

FIG. 7 illustrates an example of a procedure in which a UE performs V2X or SL communication according to a transmission mode.

Referring to FIG. 7, (a) of FIG. 7 illustrates a UE operation related to transmission mode 1 or transmission mode 3, and (b) of FIG. 7 illustrates a UE operation related to transmission mode 2 or transmission mode 4.

Referring to (a) of FIG. 7, in transmission mode 1/3, a base station performs resource scheduling for UE 1 through a PDCCH (more specifically, downlink control information (DCI)), and UE 1 performs SL/V2X communication with UE 2 according to the resource scheduling. UE 1 may transmit sidelink control information (SCI) to UE 2 through a physical sidelink control channel (PSCCH), and then transmit data based on the SCI through a physical sidelink shared channel (PSSCH). In an LTE SL, transmission mode 1 may be applied to general SL communication, and transmission mode 3 may be applied to V2X SL communication.

Referring to (b) of FIG. 7, in transmission mode 2/4, a UE may autonomously schedule a resource. More specifically, in an LTE SL, transmission mode 2 may be applied to general SL communication, in which a UE may perform an SL operation by autonomously selecting a resource from a configured resource pool. Transmission mode 4 may be applied to V2X SL communication, in which a UE may autonomously select a resource within a selection window via sensing/SA decoding processes, and then perform a V2X SL operation. UE 1 may transmit SCI to UE 2 through a PSCCH, and then transmit data based on the SCI through a PSSCH. Hereinafter, a transmission mode may be abbreviated to a mode. Procedures related to sensing and resource (re) selection may be supported in resource allocation mode 2. The sensing procedure may be defined as decoding SCI from another UE and/or SL measurement. Decoding the SCI in the sensing procedure may provide at least information about an SL resource indicated by a UE transmitting the SCI. When the SCI is decoded, the sensing procedure may use L1 SL reference signal received power (RSRP) measurement based on an SL demodulation reference signal (DMRS). The resource (re) selection procedure may use the result of the sensing procedure to determine a resource for SL transmission.

Figure 8:
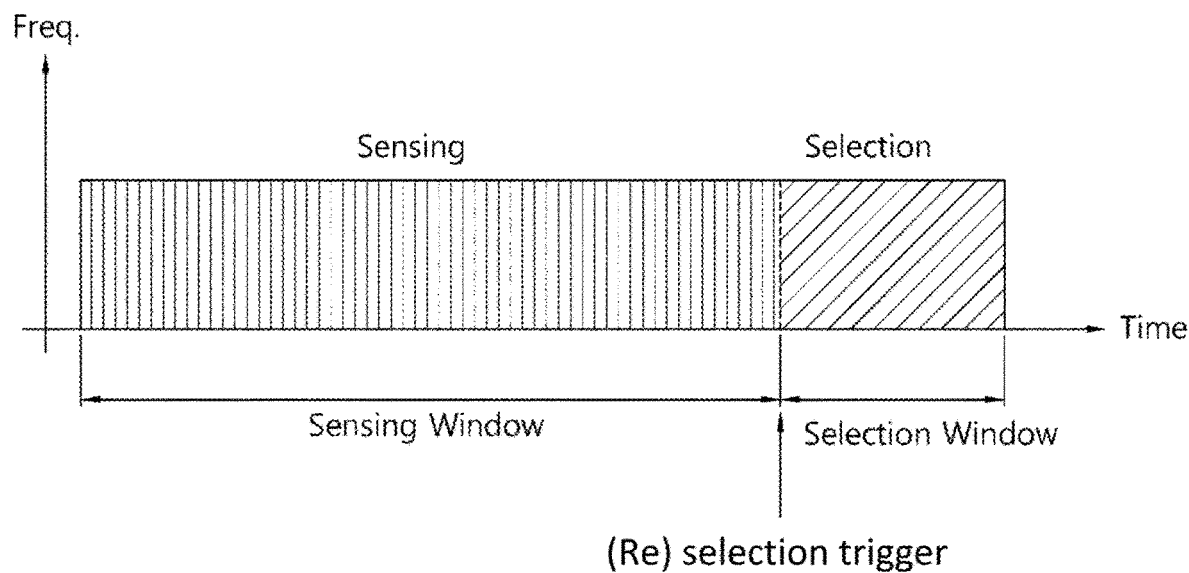

FIG. 8 illustrates an example of a method in which a UE selects a transmission resource for transmitting a signal.

Referring to FIG. 8, a UE may identify transmission resources reserved by other UEs or resources being used by other UEs through sensing within a sensing window, and may randomly select a resource with less interference among the remaining resources, excluding the reserved or used resources, within a selection window.

For example, the UE may decode a PSCCH including information about the period of the reserved resources within the sensing window, and may measure the PSSCH RSRP of resources periodically determined based on the PSCCH. The UE may exclude resources having a PSSCH RSRP value exceeding a threshold value from the selection window. Subsequently, the UE may randomly select an SL resource among the remaining resources within the selection window.

Figure 9:
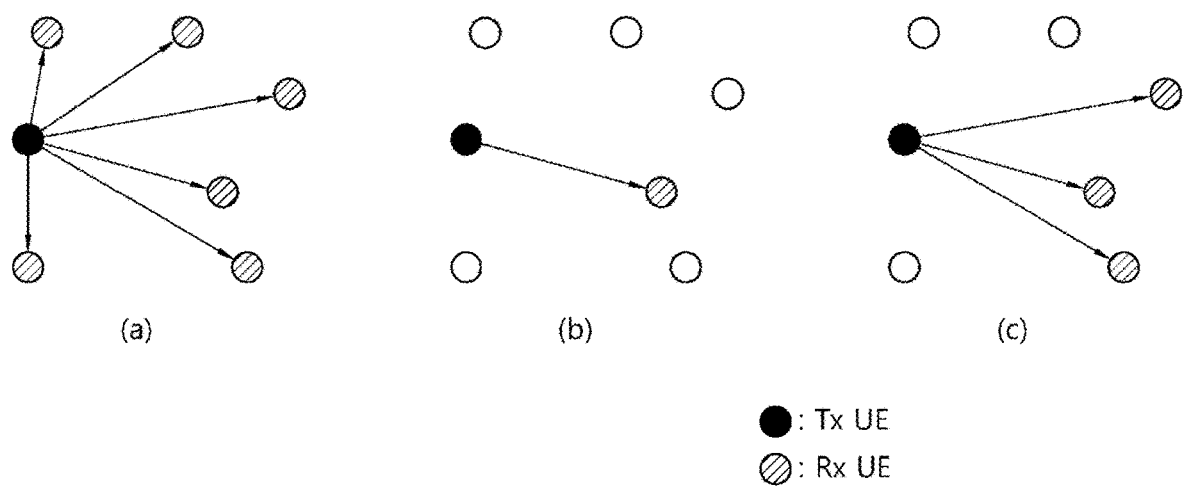

FIG. 9 illustrates an example of three cast types of NR sidelink.

Referring to FIG. 9, NR sidelink supports three types of casts: unicast, groupcast, and broadcast. In unicast SL communication, a UE may perform one-to-one communication with another UE. In groupcast SL communication, a UE may perform SL communication with one or more UEs in a group to which the UE belongs. Groupcast SL communication may be replaced with SL multicast communication, SL one-to-many communication, or the like. Hereinafter, a hybrid automatic repeat request (HARQ) procedure in an SL is described.

In SL unicast and groupcast, HARQ feedback and HARQ combining in a physical layer may be supported. For example, when a receiving UE operates in resource allocation mode 1 or 2, the receiving UE may receive a PSSCH from a transmitting UE, and may transmit HARQ feedback on the PSSCH to the transmitting UE through a physical sidelink feedback channel (PSFCH) by using a sidelink feedback control information (SFCI) format.

For example, SL HARQ feedback may be enabled for groupcast. That is, in a non-CBG operation, two HARQ feedback options may be supported for groupcast.

(1) Groupcast option 1: After a receiving UE decodes a PSCCH targeted at the receiving UE, when the receiving UE fails to decode a transport block related to the PSCCH, the receiving UE may transmit an HARQ-NACK to a transmitting UE through a PSFCH. However, when the receiving UE decodes the PSCCH targeted at the receiving UE and successfully decodes the transport block related to the PSCCH, the receiving UE may not transmit an HARQ-ACK to the transmitting UE.

(2) Groupcast option 2: After a receiving UE decodes a PSCCH targeted at the receiving UE, when the receiving UE fails to decode a transport block related to the PSCCH, the receiving UE may transmit an HARQ-NACK to a transmitting UE via a PSFCH. When the receiving UE decodes the PSCCH targeted at the receiving UE and successfully decodes the transport block related to the PSCCH, the receiving UE may transmit an HARQ-ACK to the transmitting UE via the PSFCH.

For example, in SL communication related to a service having a requirement of high reliability or a service having a requirement of relatively high reliability, an SL HARQ feedback operation and/or mechanism of a UE may be useful. For example, in SL communication related to a service having a requirement of high reliability, an operation in which a UE receiving the service transmits SL HARQ feedback to a UE transmitting the service may be useful for satisfying the requirement of high reliability.

An HARQ feedback resource may include an HARQ feedback transmission resource and/or an HARQ feedback reception resource. For example, the HARQ feedback transmission resource may include a resource for transmitting HARQ feedback and/or a resource related to transmission of HARQ feedback. For example, the HARQ feedback reception resource may include a resource for receiving HARQ feedback and/or a resource related to reception of HARQ feedback.

A PSSCH resource may include a PSSCH transmission resource and/or a PSSCH reception resource. For example, the PSSCH transmission resource may include a resource for transmitting a PSSCH and/or a resource related to transmission of a PSSCH. For example, the PSSCH reception resource may include a resource for receiving a PSSCH and/or a resource related to reception of a PSSCH.

A PSCCH resource may include a PSCCH transmission resource and/or a PSSCH reception resource. For example, the PSCCH transmission resource may include a resource for transmitting a PSCCH and/or a resource related to transmission of a PSCCH. For example, the PSCCH reception resource may include a resource for receiving a PSCCH and/or a resource related to reception of a PSCCH.

The resources may include at least one of a time domain resource, a frequency domain resource, and/or a code domain resource.

When a resource collision occurs in at least one of PSSCH transmission, PSCCH transmission, and/or HARQ feedback transmission of a UE, an SL HARQ feedback procedure and/or operation of the UE may be difficult to operate correctly. For example, when a resource collision occurs in at least one of PSSCH transmission, PSCCH transmission, and/or HARQ feedback transmission of a UE, an overall SL HARQ feedback procedure and/or operation of the UE may be difficult to perform accurately.

When a receiving UE successfully receives a PSSCH but an error occurs in HARQ feedback (e.g., an HARQ ACK) due to a resource collision, a transmitting UE may needlessly retransmit the PSSCH to the receiving UE. For example, when the receiving UE fails to receive a PSSCH and HARQ feedback is not delivered to the transmitting UE due to a resource collision, reliability or performance related to SL communication may be reduced. For example, when the receiving UE fails to receive a PSCCH and/or a PSSCH transmitted from the transmitting UE and an HARQ NACK corresponding to the PSCCH and/or the PSSCH is not correctly delivered to the transmitting UE due to a resource collision, reliability or performance related to SL communication may be reduced. Therefore, an HARQ feedback resource needs to be determined so as to avoid or minimize a collision between a plurality of UEs.

The transmitting UE may transmit a PSCCH and/or a PSSCH to the receiving UE. For example, the transmitting UE may transmit SL information to the receiving UE by using a PSCCH resource and/or a PSSCH resource. For example, the SL information may include at least one of SL control information, SL data, an SL packet, a SL transport block (TB), an SL message, and/or an SL service.

The receiving UE may determine the HARQ feedback resource. Additionally, for example, the transmitting UE may determine the HARQ feedback resource.

The HARQ feedback resource may be configured to have an association or linkage with the PSSCH. For example, the HARQ feedback resource may include at least one of a time domain resource, a frequency domain resource, and/or a code domain resource. For example, the position of the HARQ feedback resource may be configured to have an association or linkage with an associated PSSCH resource. For example, the position of the HARQ feedback resource may be configured to have an association or linkage with the position of the associated PSSCH resource, based on a predefined function. For example, the HARQ feedback resource may be determined based on at least one of information about a time domain related to the PSSCH, information about a frequency domain related to the PSSCH, and/or information about a code domain related to the PSSCH.

In addition/alternatively, for example, the HARQ feedback resource may be configured to have an association or linkage with the PSCCH. For example, the position of the HARQ feedback resource may be configured to have an association or linkage with an associated PSCCH resource. For example, the position of the HARQ feedback resource may be configured to have an association or linkage with the position of the associated PSCCH resource, based on a predefined function. For example, the HARQ feedback resource may be determined based on at least one of information about a time domain related to the PSCCH, information about a frequency domain related to the PSCCH, and/or information about a code domain related to the PSCCH.

The HARQ feedback resource may be configured in the form of a subset of frequency resources used for PSSCH transmission and/or PSCCH transmission. For example, the frequency domain of the HARQ feedback resource may be configured in the form of a subset of the frequency domain of the associated PSSCH resource and/or PSCCH resource. For example, the frequency domain of the HARQ feedback resource may be included in the frequency domain of the PSSCH resource and/or the PSCCH resource.

Figure 10:
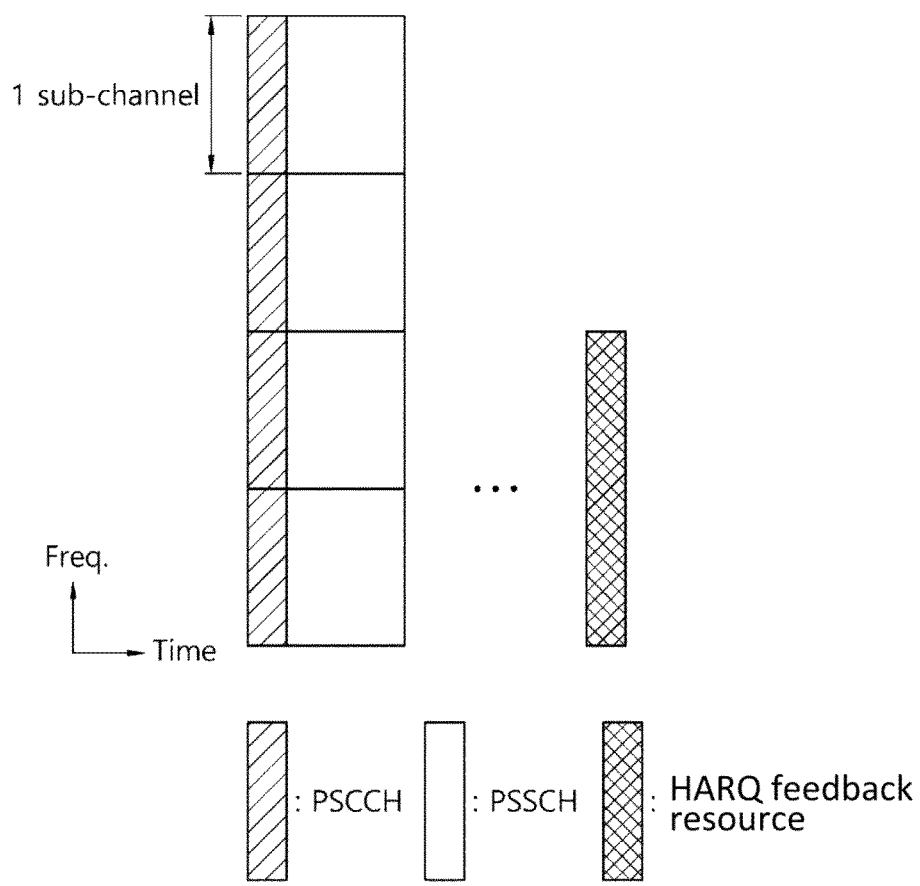

FIG. 10 illustrates an example of a resource for transmitting HARQ feedback in NR sidelink.

Referring to FIG. 10, a transmitting UE may transmit a PSCCH and/or a PSSCH to a receiving UE through four subchannels. In this case, the frequency domain of an HARQ feedback resource related to the PSCCH and/or the PSSCH may be a subset of frequency resources used by the transmitting UE to transmit the PSCCH and/or the PSSCH.

A time gap may be configured between the HARQ feedback resource and a PSSCH resource. In addition/alternatively, for example, a time gap may be configured between the HARQ feedback resource and a PSCCH resource. For example, the time gaps may be configured between time when the receiving UE receives the PSSCH and/or the PSCCH and time when the receiving UE transmits HARQ feedback considering the decoding capability of the UE and/or a delay requirement (e.g., a V2X message and/or a service-related delay requirement). For example, the time gaps may be configured between time when the transmitting UE receives the HARQ feedback and time when the transmitting UE (re)transmits the PSSCH and/or PSCCH considering the decoding capability of the UE and/or the delay requirement.

The time gap may be configured commonly within a resource pool. For example, the time gap may be configured commonly between different UEs within the resource pool. For example, the time gap may be configured commonly for the transmitting UE and the receiving UE. Therefore, the UE may simply determine the HARQ feedback resource. For example, the time gap may be configured to be specific to the resource pool.

The time gap may be configured or designated to be less than and/or equal to the smallest value among the latency budgets of coexisting services on the resource pool. For example, when service A and service B coexist on the resource pool and the latency budget of service A is less than the latency budget of service B, the time gap may be configured or designated to be less than or equal to the latency budget of service A.

The time gap may be designated such that the maximum number of retransmissions related to a transport block (TB) configured specifically to the resource pool, the type of a service, the priority of a service, the type of cast, and/or a QoS requirement of a service may be (entirely) supported/performed within a latency budget for a (related) service on the resource pool. For example, the maximum number of retransmissions may be the maximum number of allowable retransmissions including initial transmission.

The time gap may be configured or designated to be greater than and/or equal to the greatest value among the decoding capabilities of UEs. For example, the decoding capability may be the processing time of the UE needed from time when the UE terminates/ends reception of the PSSCH to time when the UE starts to transmit a PSFCH. In addition/alternatively, for example, the decoding capability may be the processing time of the UE needed from time when the UE terminates/ends reception of the PSCCH to time when the UE starts to transmit a PSFCH. For example, the time gap may be configured or designated to be greater than and/or equal to the greatest value among the decoding capabilities of the UEs in the resource pool. For example, when UE A, UE B, and UE C perform SL communication in the resource pool and the decoding capability of UE A is the lowest, the time gap may be configured or designated to be a value greater than or equal to processing time required from time when UE terminates/ends reception of a PSSCH and/or a PSCCH reception of UE A to time when UE A starts to transmit a PSFCH.

The time gap may be configured differently or independently according to the type of a service, the priority of a service, the type of SL communication, a session related to a service, a PPPP related to a service, a PPPR related to a service, a target block error rate (BLER) related to a service, a target signal-to-interference plus noise ratio (SINR) related to a service, a delay budget related to a service, and/or a UE capability. For example, the time gap may be configured differently or independently according to the type of a service, the priority of a service, the type of SL communication, a session related to a service, a PPPP related to a service, a PPPR related to a service, a target block error rate (BLER) related to a service, a target signal-to-interference plus noise ratio (SINR) related to a service, a delay budget related to a service, and/or a UE capability within the resource pool. For example, the type of SL communication may include at least one of unicast, groupcast, and/or broadcast.

The receiving UE may transmit HARQ feedback to the transmitting UE. For example, the receiving UE may transmit HARQ feedback corresponding to the PSCCH and/or the PSSCH to the transmitting UE. For example, the receiving UE may transmit the HARQ feedback to the transmitting UE by using the HARQ feedback resource determined based on the PSCCH resource and/or the PSSCH resource. For example, the transmitting UE may receive the HARQ feedback from the receiving UE on the HARQ feedback resource determined based on the PSCCH resource and/or the PSSCH resource.

When the receiving UE successfully receives the PSCCH and/or the PSSCH, the HARQ feedback may be an HARQ ACK. For example, when the receiving UE fails to receive the PSCCH and/or the PSSCH, the HARQ feedback may be at least one of an HARQ NACK and/or discontinuous detection (DTX).

In groupcast in which a plurality of UEs in a group performs SL communication with each other, an HARQ feedback resource may be configured in two forms.

(1) Option A: A common HARQ feedback resource may be configured for receiving UEs. For example, when a transmitting UE transmits a PSSCH and/or a PSCCH to a plurality of receiving UEs, an HARQ feedback resource may be configured commonly for the plurality of receiving UEs having received the PSSCH and/or the PSCCH.

(2) Option B: Different or independent HARQ feedback resources may be configured for receiving UEs. For example, different or independent HARQ feedback resources may be configured for respective receiving UE or for respective subgroups including one or more receiving UEs. For example, when a transmitting UE transmits a PSSCH and/or a PSCCH to a plurality of receiving UEs, different or independent HARQ feedback resources may be configured respectively for the plurality of receiving UEs or a plurality of subgroups having received the PSSCH and/or the PSCCH.

Option A may be applied only to groupcast option 1. For example, in groupcast option 1, a plurality of receiving UEs may transmit an HARQ NACK to a transmitting UE by using an HARQ feedback resource configured commonly for the plurality of receiving UEs only when failing to receive a PSCCH and/or PSSCH. For example, the HARQ NACK may be configured in the form of a single-frequency network (SFN). In this case, the transmitting UE may not separately receive HARQ NACKs transmitted by the plurality of receiving UEs. Therefore, the transmitting UE may not know which receiving UE has transmitted an HARQ NACK. However, the transmitting UE may know that at least one of the plurality of receiving UEs has transmitted an HARQ NACK, and may retransmit the PSCCH and/or PSSCH to the plurality of receiving UEs.

In option A, a unicast-related HARQ feedback resource structure may be reused. In addition/alternatively, for example, in option A, overhead related with an HARQ feedback resource may be reduced. However, in option A, there may be a limitation that the transmitting UE is unable to determine/recognize a DTX. For example, when a transmitting UE transmits a PSSCH and/or PSCCH to a receiving UE, the receiving UE may fail to receive the PSCCH that schedules the PSSCH. In this case, according to option A, the receiving UE may not transmit an HARQ NACK to the transmitting UE. Therefore, the transmitting UE may misunderstand that the receiving UE has successfully received the PSSCH.

In option B, in a group including a plurality of receiving UEs, different or independent HARQ feedback resources may be allocated to the respective receiving UE or respective subgroups. Here, for example, according to option B, as the number of receiving UEs or subgroups included in the group increases, a larger number of HARQ feedback resources may be required. For example, for a group including N receiving UEs, N−1 HARQ feedback resources may be required. For example, option B may be restrictively applied only to groupcast option 2.

Figure 11:
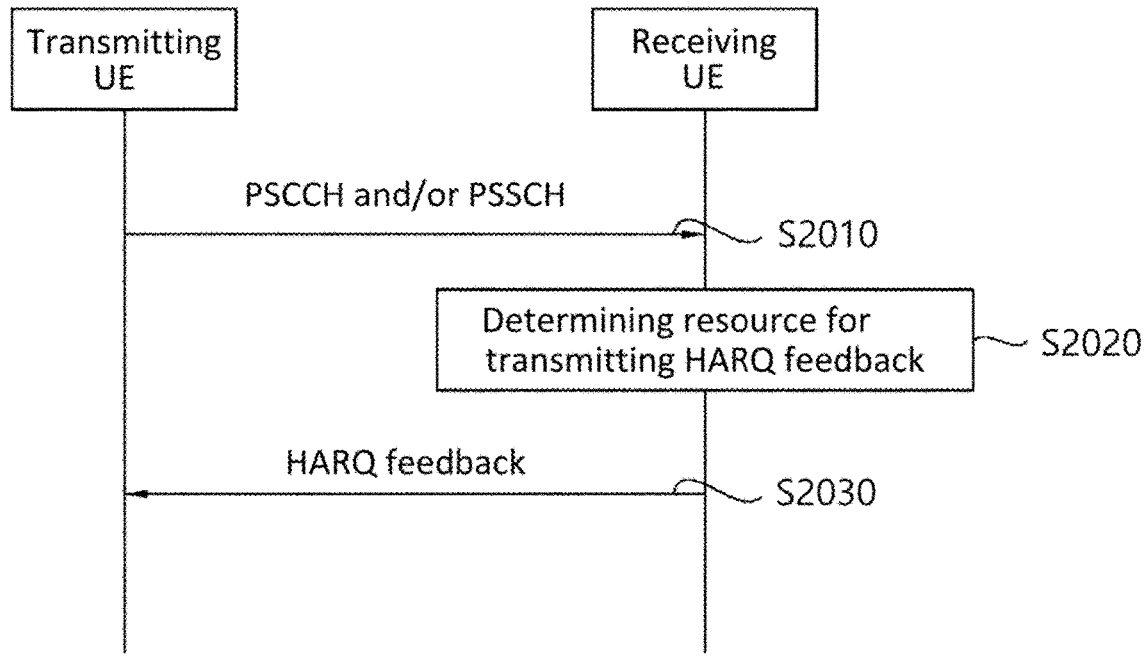

FIG. 11 illustrates an example of a procedure for transmitting and receiving HARQ feedback on a PSCCH and/or a PSSCH.

Referring to FIG. 11, a plurality of receiving UEs may each transmit HARQ feedback to a transmitting UE. For example, the plurality of receiving UEs may each transmit HARQ feedback corresponding to a PSCCH and/or PSSCH to the transmitting UE. The plurality of receiving UEs may each transmit the HARQ feedback to transmitting UE by using an HARQ feedback resource determined based on a PSCCH resource and/or a PSSCH resource.

When the receiving UEs successfully receive the PSCCH and/or the PSSCH, the HARQ feedback may be an HARQ ACK. For example, when the receiving UEs fail to receive the PSCCH and/or the PSSCH, the HARQ feedback may be at least one of an HARQ NACK and/or discontinuous detection (DTX).

A UE may determine HARQ feedback transmission power, based on at least one of an SL path loss value derived/obtained based on a reference signal on an SL channel, an SL RSRP value derived/obtained based on the reference signal on the SL channel, an SL RSRQ value derived/obtained based on the reference signal on the SL channel, an open-loop power control parameter, and/or a closed-loop power control parameter. For example, when a transmitting UE transmits a reference signal to a receiving UE through an SL channel, the receiving UE may determine HARQ feedback transmission power, based on at least one of an SL path loss value derived/obtained based on the reference signal on the SL channel, an SL RSRP value derived/obtained based on the reference signal on the SL channel, an SL RSRQ value derived/obtained based on the reference signal on the SL channel, an open-loop power control parameter, and/or a closed-loop power control parameter.

The reference signal on the SL channel may be defined in advance. The reference signal on the SL channel may be a DMRS transmitted on a PSSCH (i.e., a PSSCH DMRS) or a DMRS transmitted on a PSCCH (i.e., a PSCCH DMRS). The reference signal on the SL channel may be a CSI-RS transmitted on a PSSCH. The reference signal on the SL channel may be a reference signal used for estimating the quality (e.g., a CQI, a PMI, or an RI) of the SL channel. For example, the reference signal on the SL channel may be a reference signal used for measuring at least one of an SL path loss value, an SL RSRP value, and/or an SL RSRQ value.

The SL path loss may be path loss in a link between the transmitting UE and the receiving UE. For example, the open-loop power control parameter and/or the closed-loop power control parameter may be configured in advance. For example, the open-loop power control parameter may include Po and/or an alpha value.

Po may be a power control parameter for satisfying a target error rate (e.g., a block error rate (BLER) or a frame error rate (FER)) related to packet/message transmission on average. In addition/alternatively, for example, Po may be a power control parameter related to an average received SINR between the transmitting UE and the receiving UE. For example, Po may be a power control parameter specific to a UE, a resource pool, the type of a service, the priority of a service, a QoS requirement related to a service, the size of a (frequency) resource used for SL transmission, an MCS value used for SL transmission, a congestion level (e.g., a CBR) related to a resource pool, and/or the type of cast. For example, when the HARQ feedback transmission power is calculated/derived based on the SL RSRP and/or SL RSRQ value/range, a different Po value/range may be mapped/configured for each (preconfigured) SL RSRP and/or SL RSRQ values/ranges.

When the HARQ feedback transmission power is derived/calculated based on the SL path loss, an alpha value may be a weight applied to (measured) path loss compensation. In addition/alternatively, when the HARQ feedback transmission power is calculated/derived based on the SL RSRP and/or SL RSRQ value/range, an alpha value may be a weight applied to the (measured) SL RSRP and/or SL RSRQ value/range. In addition/alternatively, when the HARQ feedback transmission power is calculated/derived based on the SL RSRP and/or SL RSRQ value/range, an alpha value may be a weight applied to HARQ feedback transmission power mapped/configured for each (measured) SL RSRP and/or SL RSRQ value/range. Here, an alpha value/range may be configured to be specific to a UE, a resource pool, the type of a service, the priority of a service, a QoS requirement related to a service, the size of a (frequency) resource used for SL transmission, an MCS value used for SL transmission, a congestion level (e.g., a CBR) related to a resource pool, and/or the type of cast. When the HARQ feedback transmission power is calculated/derived based on the SL RSRP and/or SL RSRQ value/range, a different alpha value/range may be mapped/configured for each (preconfigured) SL RSRP and/or SL RSRQ value/range.

When the HARQ feedback transmission power is calculated/derived based on the SL RSRP and/or SL RSRQ value/range, a different offset value/range may be mapped/configured for each (preconfigured) SL RSRP and/or SL RSRQ value/range. The UE that measures the SL RSRP and/or SL RSRQ may apply an offset related to the SL RSRP value and/or the SL RSRQ value to (preconfigured normalized or nominal) SL (HARQ feedback) (maximum) transmission power, thereby determining final HARQ feedback transmission power. Here, for example, the offset value/range may be configured to be specific to a UE, a resource pool, the type of a service, the priority of a service, a QoS requirement related to a service, the size of a (frequency) resource used for SL transmission, an MCS value used for SL transmission, a congestion level (e.g., a CBR) related to a resource pool, and/or the type of cast.

A different (normalized or nominal) (maximum) HARQ feedback transmission power value/range may be mapped/configured for each SL RSRP and/or SL RSRQ value/range. For example, the (normalized or nominal) (maximum) HARQ feedback transmission power value/range may be configured to be specific to a UE, a resource pool, the type of a service, the priority of a service, a QoS requirement related to a service, the size of a (frequency) resource used for SL transmission, an MCS value used for SL transmission, a congestion level (e.g., a CBR) related to a resource pool, and/or the type of cast.

A transmission power value related to the reference signal and/or the SL channel including the reference signal may be signaled to the UE via a predefined channel. The transmitting UE may transmit the transmission power value related to the reference signal and/or the SL channel including the reference signal to the receiving UE via the predefined channel. The predefined channel may be a PSCCH. The receiving UE may be a terminal measuring at least one of SL path loss, SL RSRP, and/or SL RSRQ, based on the reference signal.

The open-loop power control parameter (and/or (maximum or minimum) HARQ feedback transmission power value mapped/configured for each SL RSRP (and/or SL RSRQ) value/range) may be configured differently or independently according to the type of a service, the priority of a service, the type of SL communication (e.g., unicast, groupcast, or broadcast), a congestion level (e.g., a channel busy ration (CBR)) (related to a resource pool), a session related to a service, a PPPP related to a service, a PPPR related to a service, a target block error rate (BLER) related to a service, a target signal-to-interference plus noise ratio (SINR) related to a service, a (minimum or maximum) target communication distance related to a service, and/or a delay budget related to a service. In addition/alternatively, for example, the closed-loop power control operation/parameter may be managed/configured differently or independently according to the type of a service, the priority of a service, the type of SL communication (e.g., unicast, groupcast, or broadcast), a congestion level (e.g., CBR) (related to a resource pool), a session related to a service, a PPPP related to a service, a PPPR related to a service, a target block error rate (BLER) related to a service, a target signal-to-interference plus noise ratio (SINR) related to a service, a (minimum or maximum) target communication distance related to a service, and/or a delay budget related to a service.

The open-loop power control parameter related to the HARQ feedback may be configured differently or independently from an open-loop power control parameter related to the PSSCH and/or PSCCH. In addition/alternatively, the closed-loop power control operation/parameter related to the HARQ feedback may be managed/configured differently or independently from a closed-loop power control operation/parameter related to the PSSCH and/or PSCCH.

FDM of the HARQ feedback resource may be allowed or configured only for receiving UEs of which the distance from the transmitting UE receiving the HARQ feedback is within a preset threshold value. In addition/alternatively, FDM of the HARQ feedback resource may be allowed or configured only for receiving UEs of which the SL path loss difference in a link between the transmitting UE and the receiving UEs is within a preset threshold value. In addition/alternatively, FDM of the HARQ feedback resource may be allowed or configured only for receiving UEs of which the SL RSRP difference in the link between the transmitting UE and the receiving UEs is within a preset threshold value. In addition/alternatively, FDM of the HARQ feedback resource may be allowed or configured only for receiving UEs of which the SL RSRQ difference in the link between the transmitting UE and the receiving UEs is within a preset threshold value.

When the distance difference between the plurality of receiving UEs and the transmitting UE is within the preset threshold value, the plurality of receiving UEs may transmit the HARQ feedback through a frequency-division-multiplexed resource on the frequency axis. In addition/alternatively, when the path loss difference between the plurality of receiving UEs and the transmitting UE is within the preset threshold, the plurality of receiving UEs may transmit the HARQ feedback through a frequency-division-multiplexed resource on the frequency axis. In addition/alternatively, when the (measured) RSRP value difference between the plurality of receiving UEs and the transmitting UE is within the preset threshold value, the plurality of receiving UEs may transmit a HARQ feedback through the frequency-division-multiplexed resource on the frequency axis. In addition/alternatively, when the (measured) RSRQ value difference between the plurality of receiving UEs and the transmitting UE is within the preset threshold value, the plurality of receiving UEs may transmit the HARQ feedback through a frequency-division-multiplexed resource on the frequency axis.

It may not be desirable that the HARQ feedback resource is frequency-division-multiplexed between UEs or subgroups within a group. When power control related to HARQ feedback transmission is not applied, it may not be desirable that the HARQ feedback resource is frequency-division-multiplexed between different UEs or different subgroups within a group. When the difference in HARQ feedback reception power between different UE or different subgroups within a group is greater than a preset threshold value, it may not be desirable that the HARQ feedback resource is frequency-division-multiplexed between the different UEs or different subgroups within the group. When the difference in SL path loss between different UEs or different subgroups within a group is greater than a preset threshold value, it may not be desirable that the HARQ feedback resource is frequency-division-multiplexed between the different UEs or different subgroups within the group. When the difference in SL RSRP between different UEs or different subgroups within a group is greater than a preset threshold value, it may not be desirable that the HARQ feedback resource is frequency-division-multiplexed between the different UEs or different subgroups within the group. When the difference in SL RSRQ between different UEs or different subgroups within a group is greater than a preset threshold value, it may not be desirable that the HARQ feedback resource is frequency-division-multiplexed between the different UEs or different subgroups within the group.

As in the above examples, when it is not desirable that the HARQ feedback resource to be frequency-division-multiplexed, the HARQ feedback resource may be frequency-division-multiplexed pseudo-randomly based on at least one of a GUE_ID, a receiving UE-related identifier, an SL HARQ process ID, and/or a transmitting UE-related. The HARQ feedback resource may be determined pseudo-randomly based on at least one of the GUE_ID, the receiving UE-related identifier, the SL HARQ process ID, and/or the transmitting UE-related identifier. For example, the HARQ feedback resource may be frequency-division-multiplexed or determined by a function having at least one of the GUE_ID, the receiving UE-related identifier, the SL HARQ process ID, and/or the transmitting UE-related identifier as an input parameter. The HARQ feedback resource may be an HARQ feedback resource for each of a plurality of UEs in a group. The HARQ feedback resource may be an HARQ feedback resource for each of subgroups in a group. For example, the receiving UE-related identifier may be a destination ID. The transmitting UE-related identifier may be a source ID. The function may be defined in advance.

A transmitting UE may transmit a PSCCH and/or a PSSCH to a receiving UE. The transmitting UE may transmit SL information to the receiving UE by using a PSCCH resource and/or a PSSCH resource. The SL information may include at least one of SL control information, SL data, an SL packet, an SL transport block (TB), an SL message, and/or an SL service.

The receiving UE may determine an HARQ feedback resource. In addition, the transmitting UE may determine an HARQ feedback resource. For example, the receiving UE may be one of a plurality of UEs performing groupcast communication within a group.

The HARQ feedback resource may be determined based on at least one of the PSCCH resource, the PSSCH resource, and/or a GUE_ID. When a plurality of receiving UEs in a group feeds an HARQ ACK or an HARQ NACK back to the transmitting UE by using different PSFCH resources, the plurality of receiving UEs in the group may determine the HARQ feedback resource by using the GUE_ID. The resource may include at least one of a time domain resource, a frequency domain resource, and/or a code domain resource. The GUE_ID may be information for identifying a UE in the group.

The receiving UE may transmit HARQ feedback to the transmitting UE. The receiving UE may transmit HARQ feedback corresponding to the PSCCH and/or PSSCH to the transmitting UE. For example, the receiving UE may transmit the HARQ feedback to the transmitting UE by using the HARQ feedback resource determined based on at least one of the PSCCH resource, the PSSCH resource, and/or the GUE_ID.

When the receiving UE successfully receives the PSCCH and/or the PSSCH, the HARQ feedback may be an HARQ ACK. When the receiving UE fails to receive the PSCCH and/or the PSSCH, the HARQ feedback may be at least one of an HARQ NACK and/or discontinuous detection (DTX).

When the transmitting UE selects PSSCH and/or PSCCH transmission resources through a sensing operation, a collision between HARQ feedback transmission-related resources may not occur. When a plurality of transmitting UEs selects different PSSCH and/or PSCCH transmission resources through a sensing operation, HARQ feedback resources may be determined based on the PSSCH resources and/or the PSCCH resources. Therefore, a collision between the HARQ feedback resources may be automatically avoided between UEs selecting the different PSSCH and/or PSCCH transmission resources based on the sensing operation.

When the transmitting UE transmits the same PSSCH and/or PSCCH to a plurality of receiving UEs in a group, the plurality of receiving UEs may determine HARQ feedback resources by using different GUE_IDs. Therefore, even though the plurality of receiving UEs in a group receives the same PSSCH and/or PSCCH, a collision between HARQ feedback resources may be prevented.

Figure 12:
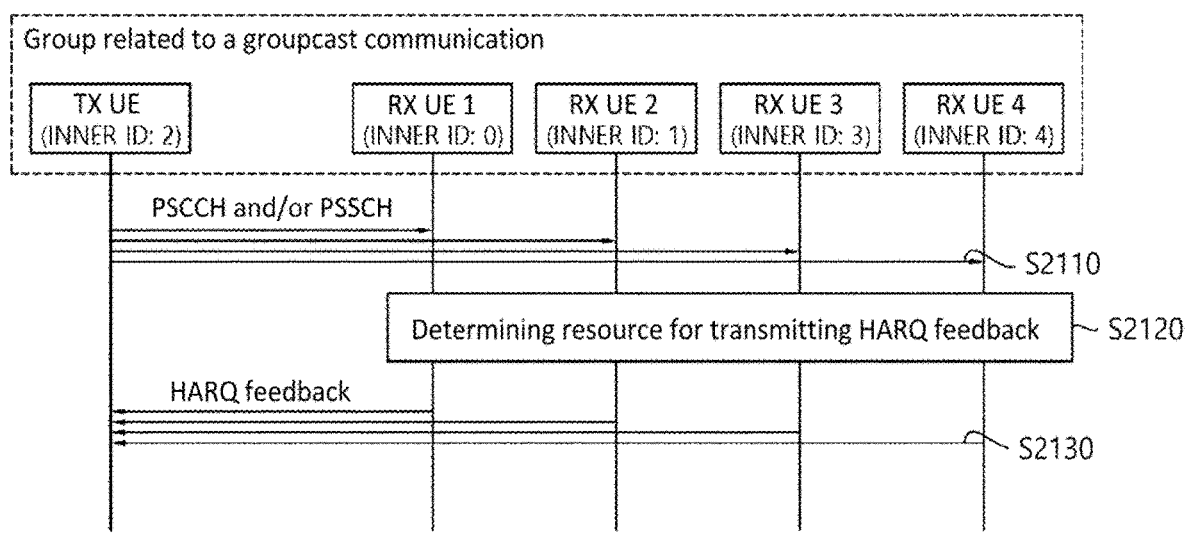

FIG. 12 illustrates an example of a procedure for transmitting and receiving HARQ feedback on a PSCCH and/or a PSSCH in groupcast SL communication.

Referring to FIG. 12, an ID for identifying a UE within a group may be allocated/designated to a plurality of UEs in the group. The ID may be referred to as an inner ID. The inner ID may be a purpose or a parameter, such as a GUE_ID. For example, regarding specific groupcast traffic, an application layer may transmit information about the inner ID of a UE and information about the number of UEs in a group to a V2X layer. The UE may be a UE transmitting the specific groupcast traffic. Regarding the specific groupcast traffic, the application layer may not transmit information about the inner ID of another UE in the group to the V2X layer. The groupcast traffic may include at least one of a groupcast service, groupcast data, a groupcast packet, and/or a groupcast message.

When a transmitting UE wants to transmit first traffic related to groupcast to a plurality of receiving UEs in a group, an application layer of the transmitting UE may transmit information about the inner ID of the transmitting UE and information about the number of UEs in the group to a V2X layer of the transmitting UE. An application layer of receiving UE 1 may transmit information about the inner ID of receiving UE 1 and information about the number of UEs in the group to a V2X layer of receiving UE 1. An application layer of receiving UE 2 may transmit information about the inner ID of receiving UE 2 and information about the number of UEs in the group to a V2X layer of receiving UE 2. An application layer of receiving UE 3 may transmit information about the inner ID of receiving UE 3 and information about the number of UEs in the group to a V2X layer of the receiving UE 3. An application layer of receiving UE 4 may transmit information about the inner ID of receiving UE 4 and information about the number of UEs in the group to a V2X layer of receiving UE 4.

The V2X layer of the UE may transmit the information about the inner ID of the UE and the information about the number of UEs in the group to an AS layer of the UE. In addition, for example, the V2X layer of the UE may also transmit an L2 ID (e.g., a source L2 ID or a destination L2 ID) and/or QoS information to the AS layer of the UE.

The transmitting UE may transmit specific groupcast traffic to the plurality of receiving UEs (S2110). The specific groupcast traffic may be transmitted through a PSSCH and/or a PSCCH.

The plurality of receiving UEs may determine an HARQ feedback resource (S2120). The plurality of receiving UEs (e.g., AS layers of the plurality of receiving UEs) may determine a resource for HARQ feedback on the specific groupcast traffic, based on the information about the inner IDs thereof and the information about the number of UEs in the group according to a predefined rule.

The transmitting UE may determine a resource for the HARQ feedback (that the transmitting UE receives). The transmitting UE may derive or determine a resource for HARQ feedback from the plurality of receiving UEs related to the specific groupcast traffic, based on the information about the inner ID thereof and the information about the number of UEs in the group.

When the application layer provides the information about the inner ID of the UE and the information about the number of UEs in the group to the V2X layer of the UE, the UE may determine or consider either groupcast option 1 or the groupcast option 2 as a (selectable) HARQ feedback option for the specific groupcast traffic. The V2X layer of the UE may determine or consider either groupcast option 1 or the groupcast option 2 as the (selectable) HARQ feedback option for the specific groupcast traffic. Additionally, the UE may finally determine or consider either groupcast option 1 or the groupcast option 2 as the HARQ feedback option for the specific groupcast traffic depending on whether a predefined condition is satisfied. When all HARQ feedback resources respective for the plurality of UEs participating in groupcast are supported in a resource pool, the UE may finally determine or consider groupcast option 2 as the HARQ feedback option for the specific groupcast traffic. When all the HARQ feedback resources respectively for the plurality of UEs participating in the groupcast are not supported in the resource pool, the UE may finally determine or consider groupcast option 1 as the HARQ feedback option for the specific groupcast traffic. Such determination may be performed in the AS layer of the UE.

When the application layer does not provide the information about the number of UEs in the group to the V2X layer of the UE, the UE may determine or consider groupcast option 1 as the HARQ feedback option for the specific groupcast traffic. When the application layer does not provide the information about the inner ID of the UE and/or the information about the number of UEs in the group to the V2X layer of the UE, the UE may determine or consider groupcast option 1 as the HARQ feedback option for the specific groupcast traffic. For example, the V2X layer of the UE may determine or consider groupcast option 1 as the HARQ feedback option for the specific groupcast traffic.

When the application layer and/or the V2X layer provide the information about the inner ID of the UE and the information about the number of UEs in the group to the AS layer of the UE, the UE may determine or consider either groupcast option 1 or groupcast option 2 as the (selectable) HARQ feedback option for the specific groupcast traffic. The AS layer of the UE may determine or consider either groupcast option 1 or groupcast option 2 as the (selectable) HARQ feedback option for the specific groupcast traffic. Additionally, the UE may finally determine or consider either groupcast option 1 or the groupcast option 2 as the HARQ feedback option for the specific groupcast traffic depending on whether the predefined condition is satisfied. When all the HARQ feedback resources respective for the plurality of UEs participating in the groupcast are supported in the resource pool, the UE may finally determine or consider groupcast option 2 as the HARQ feedback option for the specific groupcast traffic. When all the HARQ feedback resources respectively for the plurality of UEs participating in the groupcast are not supported in the resource pool, the UE may finally determine or consider groupcast option 1 as the HARQ feedback option for the specific groupcast traffic. Such determination may be performed in the AS layer of the UE.

When the application layer and/or the V2X layer does not provide the information about the number of UEs in the group to the AS layer of the UE, the UE may determine or consider groupcast option 1 as the HARQ feedback option for the specific groupcast traffic. When the application layer and/or the V2X layer does not provide the information about the inner ID of the UE and/or the information about the number of UEs in the group to the AS layer of the UE, the UE may determine or consider groupcast option 1 as the HARQ feedback option for the specific groupcast traffic. For example, the AS layer of the UE may determine or consider groupcast option 1 as the HARQ feedback option for the specific groupcast traffic.

In a resource pool-specific manner, whether at least one of groupcast option 1 and/or groupcast option 2 is supported may be signaled to the UE. In a resource pool-specific manner, whether at least one of groupcast option 1 and/or groupcast option 2 is supported may be signaled to the UE according to the type of a service, the type of cast, or a QoS requirement. In a resource pool-specific manner, whether a PSFCH resource related to groupcast option 1 is configured may be signaled to the UE according to the type of service, the type of cast, or a QoS requirement. In a resource pool-specific manner, whether a PSFCH resource related to groupcast option 2 is configured may be signaled to the UE according to the type of a service, the type of cast, or a QoS requirement.

The transmitting UE may receive HARQ feedback from the plurality of receiving UEs. The transmitting UE may receive HARQ feedback based on groupcast option 1 from the plurality of receiving UEs. For example, the transmitting UE may receive HARQ feedback based on groupcast option 2 from the plurality of receiving UEs.

An HARQ feedback operation based on a specific groupcast option may be required for specific groupcast traffic. In a case of a high reliability requirement related to a service, when the transmitting UE transmits the service to a receiving UE, the receiving UE needs to perform an HARQ feedback operation based on groupcast option 2. If the receiving UE performs an HARQ feedback operation based on groupcast option 1 for the service, DTX may occur, and thus the receiving UE needs to perform the HARQ feedback operation based on groupcast option 2 for the service with the high reliability requirement. The DTX may be a problem that the transmitting UE misunderstands that the receiving UE has successfully received a PSCCH and a PSSCH when the receiving UE fails to receive the PSCCH and does not transmit an NACK to the transmitting UE. Due to the DTX, it may be difficult to satisfy the reliability requirement of the service. Therefore, if the specific groupcast option is not supported on the resource pool or if the specific groupcast option is not supported for the traffic and/or service, the transmitting UE may perform a blind retransmission operation. If a PSFCH resource related to the specific groupcast option is not configured, the transmitting UE may perform a blind retransmission operation. The transmitting UE may perform retransmission without receiving HARQ feedback from the receiving UE.

Figure 13:
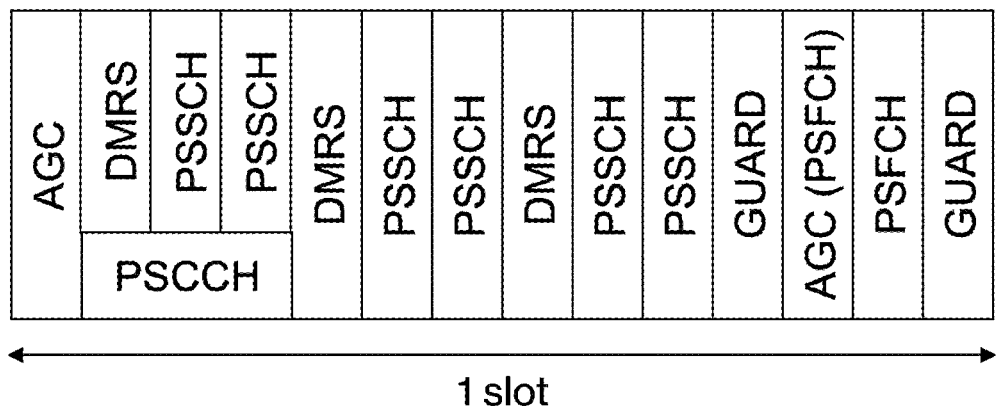
FIG. 13 illustrates a configuration of a physical sidelink control channel/physical sidelink shared channel/physical sidelink feedback channel (PSCCH/PSSCH/PSFCH) in a slot.

FIG. 13 illustrates a configuration of a PSCCH/PSSCH/PSFCH in a slot. Referring to FIG. 24, a temporal position of a PSFCH in one slot may be TDM with a PSCCH/PSSCH.

Figure 14:
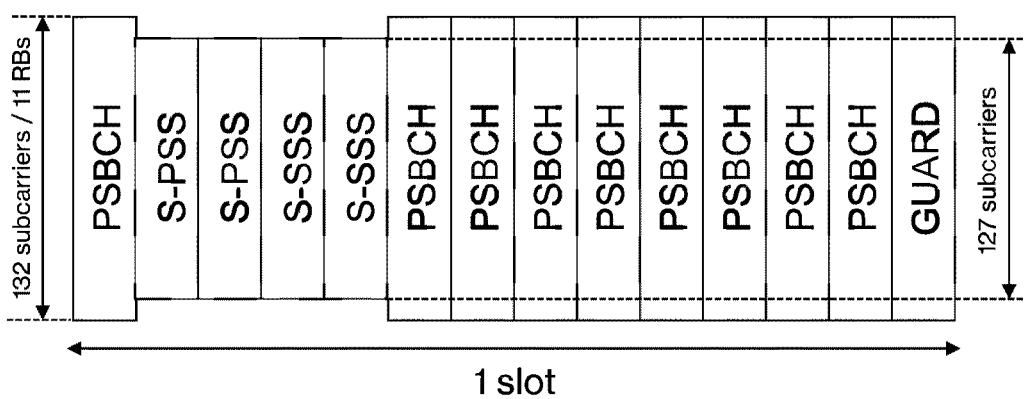
FIG. 14 illustrates a sidelink SSB (S-SSB) structure.

FIG. 14 illustrates a sidelink SSB (S-SSB) structure. Referring to FIG. 14, a UE may transmit an S-SSB so as to synchronize with other UEs via a sidelink. For an order of symbols to which a sidelink primary synchronization signal (S-PSS), a sidelink secondary synchronization signal (S-SSS), and a physical sidelink broadcast channel (PSBCH) are mapped in an S-SSB, refer to FIG. 14.

Figure 15:
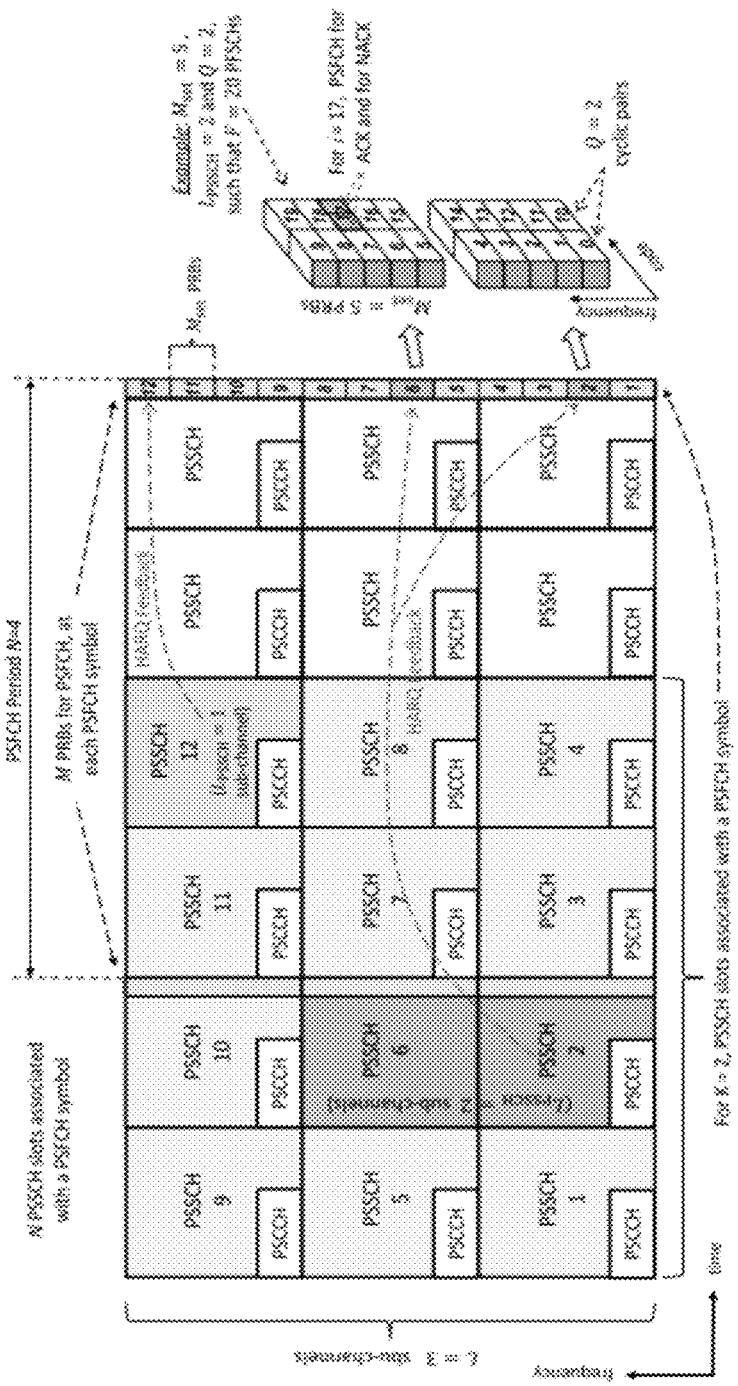
FIG. 15 illustrates an example of a method performed by a sidelink UE to determine a PSFCH resource.

FIG. 15 illustrates a method performed by a sidelink UE to determine a PSFCH resource.

FIG. 15 illustrates a situation in which a PSFCH period of 4 slots in the upper layer, a minimum time gap from PSSCH reception to PSFCH transmission in 2 slots, a PSFCH resource type according to the number of PSSCH subchannels, and two cyclic shift (CS) pairs are configured. In addition, FIG. 15 illustrates a situation in which a PSFCH transmitting UE transmits a PSSCH (i.e., PSSCH 2 and PSSCH 6) by using two subchannels in the second slot. In this situation, the PSFCH transmitting UE may determine an appropriate resource according to the ID (Tx ID or P_ID) of the transmitting UE and the ID (Rx ID or M_ID) of the receiving UE among 10 PRBs and 2 CS pairs corresponding to No. 2 and No. 6 in the PSFCH occasion configured in the 6th slot according to the PSFCH resource configuration rule defined in 3GPP TS 38.213, i.e., a total of 20 candidate resources (i.e., $R^{PSFCH}_{PRB,cs}=20$). The drawing illustrates a situation in which the result of (Tx ID+Rx ID) mod 20 is 17 according to 3GPP TS 38.213, and illustrates that the third PRB and the second CS pair (i.e., CS=3 in case of NACK, CS=9 in case of ACK) of the 6th PRB group are used for PSFCH transmission. The value of Rx ID is configured to 0 except in the case of groupcast requiring ACK/NACK feedback.

<Communication Method in Unlicensed Band>

Figure 16:
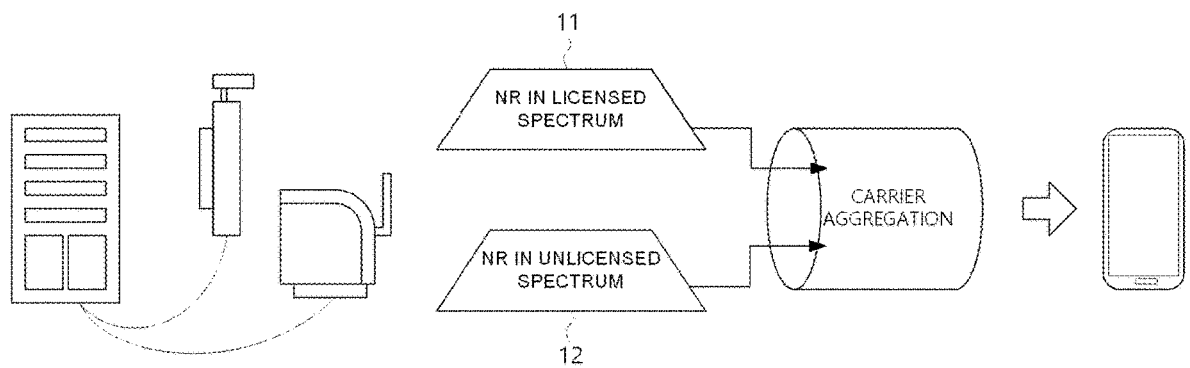
FIG. 16 illustrates a New Radio-Unlicensed (NR-U) service environment.

FIG. 16 illustrates a New Radio-Unlicensed (NR-U) service environment.

Referring to FIG. 16, a service environment in which NR technology 11 in the existing licensed band and NR-Unlicensed (NR-U), i.e., NR technology 12 in the unlicensed band may be provide to the user. For example, in the NR-U environment, NR technology 11 in the licensed band and the NR technology 21 in the unlicensed band may be integrated using technologies such as carrier aggregation which may contribute to network capacity expansion. In addition, in an asymmetric traffic structure with more downlink data than uplink data, NR-U can provide an NR service optimized for various needs or environments. For convenience, the NR technology in the licensed band is referred to as NR-L (NR-Licensed), and the NR technology in the unlicensed band is referred to as NR-U (NR-Unlicensed).

Figure 17:
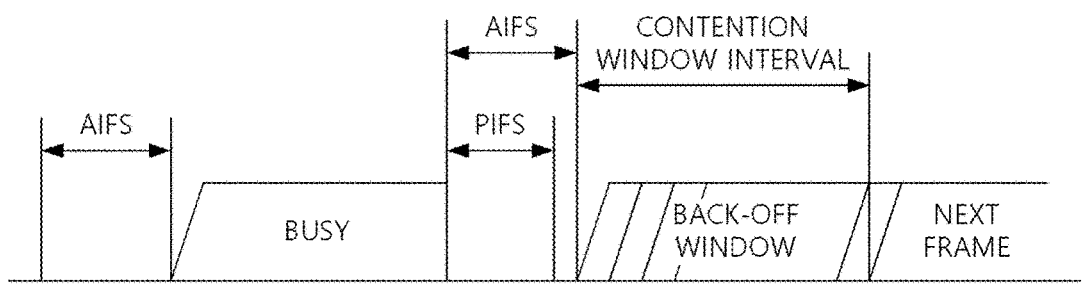
FIG. 17 illustrates a communication method (e.g., wireless LAN) operating in an existing unlicensed band.

FIG. 17 illustrates a conventional communication scheme (e.g., wireless LAN) operating in an unlicensed band. Since most devices that operate in the unlicensed band operate based on listen-before-talk (LBT), a clear channel assessment (CCA) technique that senses a channel before data transmission is performed.

Referring to FIG. 17, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel. Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a backoff procedure after a defer duration (e.g., arbitration interframe space (AIFS), PCF IFS (PIFS), or the like). The defer duration represents a minimum time when the terminal needs to wait after the channel is idle. The backoff procedure allows the terminal to further wait for a predetermined time after the defer duration. For example, the terminal stands by while decreasing a slot time for slot times corresponding to a random number allocated to the terminal in the contention window (CW) during the channel is idle, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the backoff procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since the existing communication in the unlicensed band mostly operates based on LBT, a channel access in the NR-U system also performs LBT for coexistence with existing devices. Specifically, the channel access method on the unlicensed band in the NR may be classified into the following four categories according to the presence/absence of LBT/application method.

Category 1: No LBT
  The Tx entity does not perform the LBT procedure for transmission.

Category 2: LBT without Random Backoff
  The Tx entity senses whether a channel is idle during a first interval without random backoff to perform a transmission. That is, the Tx entity may perform a transmission through the channel immediately after the channel is sensed to be idle during the first interval. The first interval is an interval of a predetermined length immediately before the Tx entity performs the transmission. According to an embodiment, the first interval may be an interval of 25 us length, but the present invention is not limited thereto.

Category 3: LBT Performing Random Backoff Using CW of Fixed Size
  The Tx entity obtains a random value within the CW of the fixed size, sets it to an initial value of a backoff counter (or backoff timer) N, and performs backoff by using the set backoff counter N. That is, in the backoff procedure, the Tx entity decreases the backoff counter by 1 whenever the channel is sensed to be idle for a predetermined slot period. Here, the predetermined slot period may be 9 µs, but the present invention is not limited thereto. The backoff counter N is decreased by 1 from the initial value, and when the value of the backoff counter N reaches 0, the Tx entity may perform the transmission. Meanwhile, in order to perform backoff, the Tx entity first senses whether the channel is idle during a second interval (that is, a defer duration Td). According to an embodiment of the present invention, the Tx entity may sense (determine) whether the channel is idle during the second interval, according to whether the channel is idle for at least some period (e.g., one slot period) within the second interval. The second interval may be set based on the channel access priority class of the Tx entity, and consists of a period of 16 us and m consecutive slot periods. Here, m is a value set according to the channel access priority class. The Tx entity performs channel sensing to decrease the backoff counter when the channel is sensed to be idle during the second interval. On the other hand, when the channel is sensed to be busy during the backoff procedure, the backoff procedure is stopped. After stopping the backoff procedure, the Tx entity may resume backoff when the channel is sensed to be idle for an additional second interval. In this way, the Tx entity may perform the transmission when the channel is idle during the slot period of the backoff counter N, in addition to the second interval. In this case, the initial value of the backoff counter N is obtained within the CW of the fixed size.

Category 4: LBT Performing Random Backoff by Using CW of Variable Size
  The Tx entity obtains a random value within the CW of a variable size, sets the random value to an initial value of a backoff counter (or backoff timer) N, and performs backoff by using the set backoff counter N. More specifically, the Tx entity may adjust the size of the CW based on HARQ-ACK information for the previous transmission, and the initial value of the backoff counter N is obtained within the CW of the adjusted size. A specific process of performing backoff by the Tx entity is as described in Category 3. The Tx entity may perform the transmission when the channel is idle during the slot period of the backoff counter N, in addition to the second interval. In this case, the initial value of the backoff counter N is obtained within the CW of the variable size.

In the above Category 1 to Category 4, the Tx entity may be a base station or a UE. According to an embodiment of the present invention, a first type channel access may refer to a Category 4 channel access, and a second type channel access may refer to a Category 2 channel access.

Figure 18:
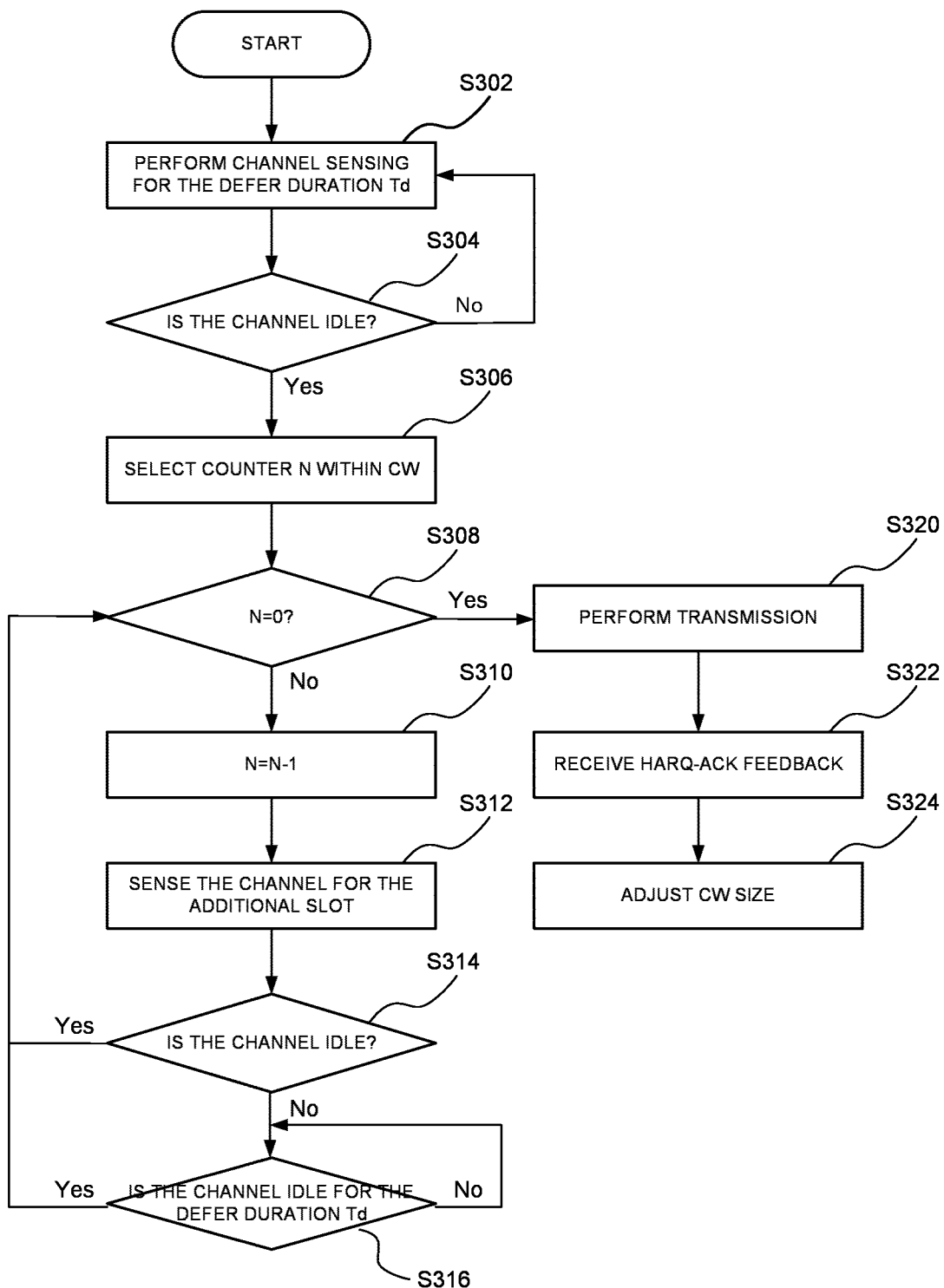
FIG. 18 illustrates a channel access procedure based on Category 4 LBT.

FIG. 18 illustrates a channel access procedure based on Category 4 LBT according to an embodiment of the present invention.

In order to perform the channel access, first, the Tx entity performs channel sensing for the defer duration Td (S302). According to an embodiment of the present invention, the channel sensing for a defer duration Td in step S302 may be performed through channel sensing for at least a portion of the defer duration Td. For example, the channel sensing for the defer duration Td may be performed through the channel sensing during one slot period within the defer duration Td. The Tx entity checks whether the channel is idle through the channel sensing for the defer duration Td (S304). If the channel is sensed to be idle for the defer duration Td, the Tx entity proceeds to step S306. If the channel is not sensed to be idle for the defer duration Td (that is, sensed to be busy), the Tx entity returns to step S302. The Tx entity repeats steps S302 to S304 until the channel is sensed to be idle for the defer duration Td. The defer duration Td may be set based on the channel access priority class of the Tx entity, and consists of a period of 16 us and m consecutive slot periods. Here, m is a value set according to the channel access priority class.

Next, the Tx entity obtains a random value within a predetermined CW, sets the random value to the initial value of the backoff counter (or backoff timer) N (S306), and proceeds to step S308. The initial value of the backoff counter N is randomly selected from values between 0 and CW. The Tx entity performs the backoff procedure by using the set backoff counter N. That is, the Tx entity performs the backoff procedure by repeating S308 to S316 until the value of the backoff counter N reaches 0. Meanwhile, FIG. 13 illustrates that step S306 is performed after the channel is sensed to be idle for the defer duration Td, but the present invention is not limited thereto. That is, step S306 may be performed independently of steps S302 to S304, and may be performed prior to steps S302 to S304. When step S306 is performed prior to steps S302 to S304, if the channel is sensed to be idle for the defer duration Td by steps S302 to S304, the Tx entity proceeds to step S308.

In step S308, the Tx entity checks whether the value of the backoff counter N is 0. If the value of the backoff counter N is 0, the Tx entity proceeds to step S320 to perform a transmission. If the value of the backoff counter N is not 0, the Tx entity proceeds to step S310. In step S310, the Tx entity decreases the value of the backoff counter N by 1. According to an embodiment, the Tx entity may selectively decrease the value of the backoff counter by 1 in the channel sensing process for each slot. In this case, step S310 may be skipped at least once by the selection of the Tx entity. Next, the Tx entity performs channel sensing for an additional slot period (S312). The Tx entity checks whether the channel is idle through the channel sensing for the additional slot period (S314). If the channel is sensed to be idle for the additional slot period, the Tx entity returns to step S308. In this way, the Tx entity may decrease the backoff counter by 1 whenever the channel is sensed to be idle for a predetermined slot period. Here, the predetermined slot period may be 9 μs, but the present invention is not limited thereto.

In step S314, if the channel is not sensed to be idle for the additional slot period (that is, sensed to be busy), the Tx entity proceeds to step S316. In step S316, the Tx entity checks whether the channel is idle for the additional defer duration Td. According to an embodiment of the present invention, the channel sensing in step S316 may be performed in units of slots. That is, the Tx entity checks whether the channel is sensed to be idle during all slot periods of the additional defer duration Td. When the busy slot is detected within the additional defer duration Td, the Tx entity immediately restarts step S316. When the channel is sensed to be idle during all slot periods of the additional defer duration Td, the Tx entity returns to step S308.

On the other hand, if the value of the backoff counter N is 0 in the check of step S308, the Tx entity performs the transmission (S320). The Tx entity receives a HARQ-ACK feedback corresponding to the transmission (S322). The Tx entity may check whether the previous transmission is successful through the received HARQ-ACK feedback. Next, the Tx entity adjusts the CW size for the next transmission based on the received HARQ-ACK feedback (S324).

As described above, after the channel is sensed to be idle for the defer duration Td, the Tx entity may perform the transmission when the channel is idle for N additional slot periods. As described above, the Tx entity may be a base station or a UE, and the channel access procedure of FIG. 18 may be used for downlink transmission of the base station and/or uplink transmission of the UE.

Figure 19:
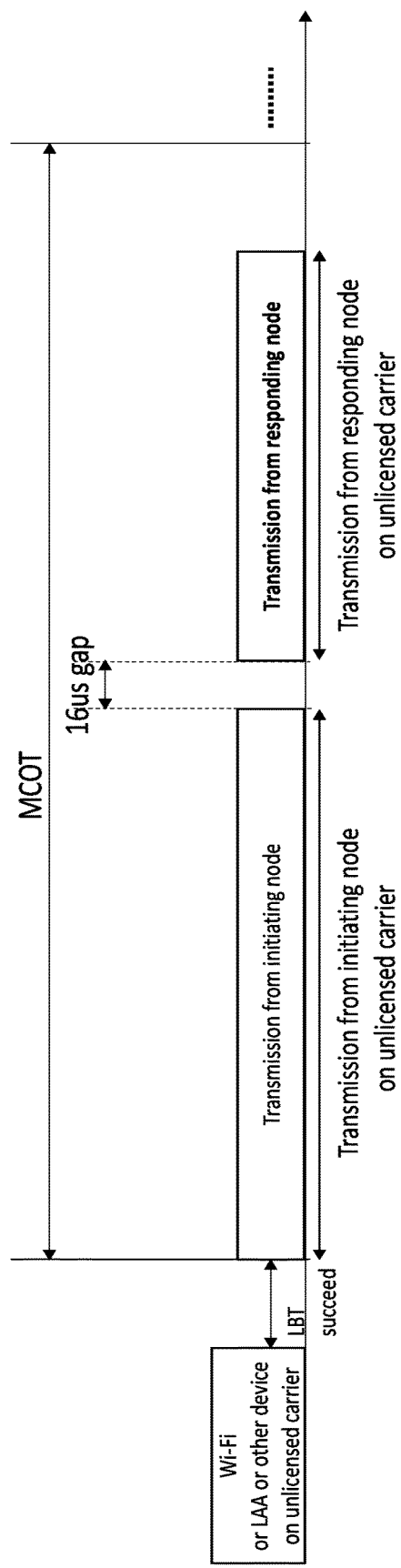
FIG. 19 illustrates an example of channel occupancy time (COT) configurations and a corresponding operation.

FIG. 19 illustrates a channel access procedure performed by a wireless communication device in an unlicensed band, and an LBT procedure used when a wireless communication device performs a channel access in an unlicensed band. In particular, a channel access in which the wireless communication device performs a transmission according to a result of channel sensing within a time interval of a predetermined duration may be configured in the wireless communication device. In this case, a method for operating a wireless communication device when the wireless communication device fails to access a channel will be described. The specified duration which has been mentioned earlier may be 16 μs.

For convenience of description, the wireless communication device, which is a wireless endpoint that initiates channel occupation, is referred to as an initiating node. In addition, a wireless communication device, which is a wireless endpoint communicating with the initiating node, is referred to as a responding node. The initiating node may be a base station and the responding node may be a UE. In addition, the initiating node may be a UE and the responding node may be a base station. When the initiating node intends to transmit data, the initiating node may perform a channel access according to a channel access priority class determined according to the type of data. In this case, a parameter used for a channel access may be determined according to the type of data. The parameters used for the channel access may include any one of the minimum value of the CW, the maximum value of the CW, the maximum occupancy time (MCOT), which is the maximum duration capable of occupying a channel in one channel occupancy, and the number (mp) of sensing slots. Specifically, the initiating node may perform the above-described Category 4 LBT according to the channel access priority class determined according to the type of data.

Table 1 below shows an example of values of parameters used for a channel access according to the channel access priority class. Specifically, Table 1 shows values of parameters used for a channel access for each channel access priority class for the downlink transmission in the LTE LAA system.

When the downlink channel transmitted by the wireless communication device includes data traffic, the defer duration may be configured according to the channel access priority class of traffic included in the downlink channel. In addition, the defer duration may include an initial duration Tf or one or more (mp) slot durations Tsl. In this case, the slot duration Tsl may be 9 μs. The initial duration includes one idle slot duration Tsl. In addition, the number (mp) of slot durations included in the defer duration may be configured according to the above-described channel access priority class. Specifically, the number (mp) of slot durations included in the defer duration may be configured as shown in Table 1.

TABLE 1

| Channel Access Priority Class (P) | $m_p$ | $CW_{min,p}$ | $CW_{max,p}$ | $T_{min,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The wireless communication device may configure the range of the CW value according to the channel access priority class (CAPC). Specifically, the wireless communication device may configure the value of CW to satisfy $CW_{min,p} \leq CW \leq CW_{max,p}$. In this case, the minimum value ($CW_{min,p}$) and the maximum value ($CW_{max,p}$) of CW may be determined according to the channel access priority class. Specifically, the minimum value ($CW_{min,p}$) and the maximum value ($CW_{max,p}$) of CW may be determined as shown in Table 1. Referring to FIG. 17, the wireless communication device selects a random counter value within the CW value and may adjust the CW value (i.e., CW size) depending on whether the channel access (or channel transmission) is successful. For example, when the channel access (or channel transmission) is successful, the wireless communication device may reset the current CW value to the minimum value for each CAPC. When the channel access (or channel transmission) fails, the wireless communication device may configure the current CW value to the next highest possible value within the range of maximum values for each CAPC.

In addition, in the wireless communication device of the unlicensed band, the MCOT Tmcot,p may be determined according to the channel access priority of data included in the transmission as described above. Specifically, the MCOT may be determined as shown in Table 1. Accordingly, the wireless communication device may not be allowed to perform continuous transmissions for a time exceeding the MCOT in the unlicensed band. This is because the unlicensed band is a frequency band used by various wireless communication devices according to certain rules. In Table 1, when the value of the channel access priority class is p=3 or p=4, the unlicensed band is used for a long term according to the regulations, and there is no wireless communication device using other technology, the wireless communication device may be configured with Tmcot,p=10 ms. Otherwise, the wireless communication device may be configured with Tmcot,p=8 ms.

Table 2 shows values of parameters used for a channel access for each channel access priority class for uplink transmission used in the LTE LAA system.

TABLE 2

| LST priority class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms (see note 1) or 10 ms (see note 2) | {15, 31, 63, 127, 255, 511, 1023} |
| 4 | 7 | 15 | 1023 | 6 ms (see note 1) or 10 ms (see note 2) | {15, 31, 63, 127, 255, 511, 1023} |

NOTE 1:
The MCOT of 6 ms may be increased to 8 ms by inserting one or more gaps. The minimum duration of a pause shall be 100 μs. The maximum duration (Channel Occupancy) before including any such gap shall be 6 ms. The gap duration is not included in the channel occupancy time.
NOTE 2:
If the absence of any other technologysharing the carrier can be guaranteed on a long term basis (e.g. by level of regulation), the maximum channel occupancy time (MCOT) for LBT priority classes 3 and 4 is for 10 ms, otherwise, the MCOT for LBT priority classes 3 and 4 is 6 ms as in note 1.

As described in Table 5, the MCOT value 6 ms may be increased to 8 ms when one or more gaps are included in the transmission. The gap represents the time from when the transmission is stopped in a carrier until the transmission is resumed in the carrier. In this case, the minimum value of the duration of the gap is 100 μs. Furthermore, the maximum value of the duration of transmission performed before the gap is included is 6 ms. Furthermore, the duration of the gap is not included in the channel occupancy time. When the value of the channel access priority class is 3 or 4 and it is guaranteed that no other radio access technology is used in the carrier on which the channel access is performed, the value of MCOT may be 10 ms. In this case, another wireless access technology may include Wi-Fi. Otherwise, the value of the MCOT may be determined as described in Note 1 of Table 5.

The COT represents the time the wireless communication device occupies a channel. As described above, the MCOT represents a time during which the initiating node is able to continuously occupy a channel in any one carrier of a unlicensed band to the maximum. However, as described above, the gap, which is an interval in which the transmission is not performed, may be included between a plurality of transmissions, and when the gap is included, the value of the MCOT may be applied differently.

Embodiment: Channel Access for Sidelink (SL) Transmission

First, terms used in the disclosure are described.
Type 1 channel access procedure (CAP): A channel access procedure with random-backoff (refer to FIG. 17).
Channel sensing may be performed based on a random value selected in the CW. If it is determined that the channel is idle as a result of performing channel access, SL transmission may be performed.
Type 2 CAP: Channel access procedure without random-backoff. For channel transmission, channel sensing may be performed during a fixed-length sensing interval. It may be classified into Type 2A/2B/2C depending on the fixed-length sensing interval.
CO (or COT): CO means that a wireless communication device (e.g., UE) has initiated transmission on a channel and occupies the channel. COT represents the channel occupancy time.
COT sharing: It means that the COT initiated by the wireless communication device (e.g., UE) is shared by the same/different wireless communication devices (e.g., refer to FIG. 19).
SL transmission: SL transmission includes transmission of an SL channel. The SL channel includes physical sidelink control channel (PSCCH), physical sidelink shared channel (PSSCH), physical sidelink feedback channel (PSFCH), physical sidelink broadcast channel (PSBCH), etc.
PSCCH/PSSCH: It means PSSCH and/or PSSCH.
Sidelink control information (SCI): SCI may be divided into $1^{st}$ SCI (or SCI format 1) and $2^{nd}$ SCI (or SCI format 2). The $1^{st}$ SCI is transmitted through PSCCH. The $1^{st}$ SCI is used to schedule (i) PSSCH and (ii) $2^{nd}$ SCI on PSSCH. For example, the $1^{st}$ SCI includes time/frequency resource information for PSSCH reception, priority indicator, $2^{nd}$ SCI format information, etc. The priority indicator indicates the traffic priority of PSSCH. The $1^{st}$ SCI may be decoded by all UEs in the cell for channel sensing. On the other hand, the $2^{nd}$ SCI is decoded by each receiving UE and includes the remaining information required for PSSCH decoding. The $2^{nd}$ SCI may be transmitted by using the PSSCH resource. For example, the $2^{nd}$ SCI includes the HARQ process number, cast type indicator, source ID, destination ID, etc.

Channel Access for a Plurality of SL Transmissions

As illustrated in FIG. 9, SL transmission may be transmitted/received between multiple UEs. For example, one Tx UE may perform a plurality of SL transmissions to multiple Rx UEs, or multiple Rx UEs may perform SL transmission simultaneously.

Meanwhile, when performing SL transmission in an unlicensed band, the UE may perform a channel access procedure (CAP) to transmit SL transmission. For example, the UE may perform Type 1 CAP to transmit SL transmission (refer to FIGS. 17 to 18). Type 1 CAP is performed using parameters (e.g., CW) used for channel access, and parameters used for channel access may be defined for each CAPC value (refer to Tables 1 to 2). The CAPC value indicates the priority of the parameters (or channel access parameters) used for channel access. For example, referring to Table 1, the CAPC value corresponds to the CW minimum value and CW maximum value, and the higher the CAPC value, the higher the CW minimum value and CW maximum value. Accordingly, the higher the CAPC value, the lower the channel access priority of the UE because the counter value for random back-off is selected within a wider CW range. The CAPC value used when transmitting SL may be determined based on the priority of SL transmission.

Figure 20:
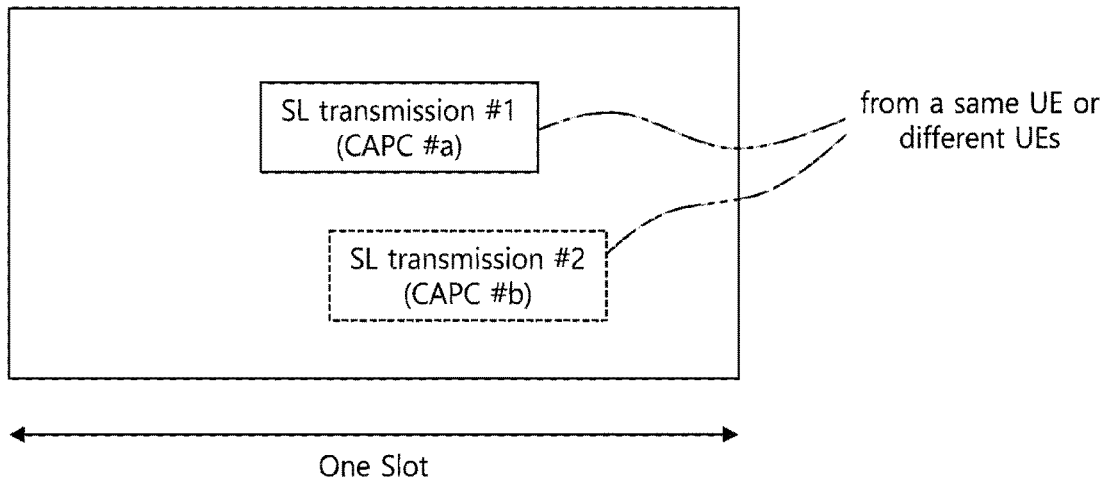
FIG. 20 illustrates a plurality of SL transmissions.

FIG. 20 illustrates a problem when performing a plurality of SL transmissions Referring to FIG. 20, a plurality of SL transmissions may be scheduled within a slot. Here, the plurality of SL transmissions may be scheduled to be transmitted from one UE or may be scheduled to be transmitted from two or more different UEs. Here, the SL transmission includes transmission of the SL channel illustrated in FIGS. 13 to 14. For example, the SL channel may include at least one of PSCCH, PSSCH, PSFCH, and PSBCH. In this case, each SL transmission may be associated with a respective CAPC value. For example, CAPC #a may be associated with SL transmission #1, and CAPC #b may be associated with SL transmission #2. Here, CAPC #a and CAPC #b may be different. In this case, Type 1 CAP may be performed by using channel access parameters with different priorities for each SL transmission in order to transmit the plurality of SL transmissions. Accordingly, SL transmission using channel access parameters with low priority may be affected by SL transmission using channel access parameters with high priority. For example, if SL transmission #1 succeeds in channel access and is transmitted, Type 1 CAP for SL #2 may fail due to transmission of SL transmission #1.

Hereinafter, a channel access method for transmitting a plurality of SL transmissions simultaneously (e.g., in one slot) is described. To help understanding the disclosure, PSFCH transmission is used as an example of SL transmission. However, the disclosure may also be applied to cases where channel access is performed to transmit multiple different SL channels (refer to FIGS. 13 to 14) within one slot.

Hereinafter, a method of configuring CAPC when transmitting multiple PSFCHs in the same PSFCH occasion within a slot is described in detail by dividing the cases. Here, the PSFCH occasion indicates time/frequency resources for PSFCH transmission (e.g., refer to FIGS. 10 and 15).

1. Method for Determining CAPC by a UE when there are Multiple SL Channels (e.g., PSFCH) that One UE Transmits to Another UE When one UE transmits two or more PSFCHs to different UEs at the same PSFCH occasion, the CAPC value for each PSFCH may be independently configured based on the traffic priority corresponding to the PSSCH transmitted from different UEs. Therefore, the CAPC value for each PSFCH may be configured differently. In this case, the transmission of another PSFCH that performs backoff by setting the CW size relatively long (i.e., higher CAPC value=lower priority) may be affected by the transmission of a PSFCH that succeeds in channel access by setting the CW size short (i.e., lower CAPC value=higher priority). For example, some of the transmissions of two or more PSFCHs intended to be transmitted from one UE may not occur. Therefore, when one UE transmits two or more PSFCHs to different UEs in the same PSFCH occasion, a CAPC configuration method to resolve collisions between PSFCH transmissions within one UE should be discussed.

At least one UE may have two or more PSFCH transmissions intended to be transmitted to different UEs at the same PSFCH occasion. Here, the priority of the PSFCH transmission succeeds the traffic priority of the PSSCH corresponding to the PSFCH transmission, and the traffic priority of the PSSCH may be known by decoding the SCI of the PSCCH. The following method may be considered as a CAPC configuration method applied during the channel access procedure (CAP) for different PSFCH transmissions to resolve collisions that may occur during a channel access procedure (CAP) for PSFCH transmissions that one UE transmits to two or more different UEs at the same PSFCH occasion. When performing a channel access procedure (CAP) for two or more PSFCH transmissions, a common CAPC value may be configured to perform Type 1 channel access, and one UE may transmit the two or more PSFCHs at the same PSFCH occasion. In this case, when one UE transmits the PSFCH, the transmission of different PSFCHs is less affected. Accordingly, it is possible to avoid PSFCH transmission failure due to the PSFCH collision that may occur when each PSFCH transmission transmitted by one UE uses different channel access parameters. As a method for configuring one CAPC value in common when performing Type 1 channel access for multiple PSFCH transmissions, when one UE configures a CAPC for each PSFCH according to the traffic priority for each PSSCH transmitted from different UEs, the highest CAPC value (i.e., the lowest priority) among the CAPC values configured for each PSFCH may be configured as a common CAPC value. Accordingly, the UE may perform a Type 1 channel access procedure before the start of the PSFCH occasion configured for itself, and if the channel access is successful, the UE may perform transmission of each PSFCH transmitted to different UEs at the start time point of transmitting the same PSFCH. That is, the UE may perform a plurality of SL transmissions in a slot if the channel access is successful by performing one Type 1 channel access procedure based on the highest CAPC value among a plurality of CAPC values associated with the plurality of SL transmissions.

If the channel access is not successful at the start time point of transmitting the same PSFCH, the UE may drop the corresponding PSFCH. Alternatively, if the channel access is not successful at the start time point of transmitting the same PSFCH, the UE may attempt to perform the Type 1 channel access procedure at the next PSFCH occasion for PSFCH transmission or a PSFCH occasion that may be additionally configured according to the channel access failure, and then perform PSFCH transmission.

As another method, if different UEs cannot know the traffic priority to be used for PSFCH transmission in a PSFCH occasion, as a CAPC configuration method for resolving collisions between PSFCH transmissions transmitted by two or more UEs, a fixed value (e.g., lowest CAPC value=highest priority) may be configured to be used as the CAPC value for PSFCH transmission. This may be the least complex method for resolving PSFCH collisions between different UEs.

Figure 21:
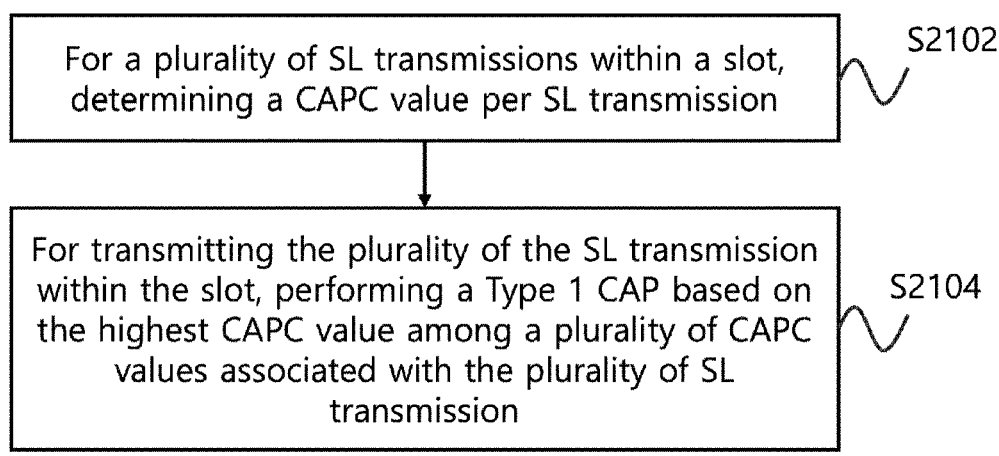
FIGS. 21 to 22 illustrate SL transmission methods according to the present invention.

FIG. 21 illustrates an SL transmission process according to an example of the disclosure.

Referring to FIG. 21, a wireless device (e.g., a UE) may determine each channel access priority class (CAPC) value for each SL transmission for a plurality of sidelink (SL) transmissions within one slot (S2702). Thereafter, in order to transmit the plurality of SL transmissions in the one slot, the wireless device may perform one Type 1 CAP based on the highest CAPC value among the plurality of CAPC values associated with the plurality of SL transmissions. If the one Type 1 CAP is successful, the wireless device may transmit the plurality of SL transmissions to each corresponding receiving UE. The plurality of SL transmissions may correspond to two or more receiving UEs. Here, each CAPC value is associated with a parameter used for channel access, and the higher the CAPC value, the lower the priority of the parameter used for the channel access. Here, the parameter used for the channel access includes a CW parameter (refer to Tables 1 to 2). For example, the CW parameter may include a CW minimum value and a CW maximum value. In addition, the plurality of SL transmissions may be scheduled to be transmitted on the same time resource within the one slot. Here, the plurality of SL transmissions may include a PSFCH transmission. In addition, the plurality of SL transmissions may include a plurality of PSFCH transmissions. Here, the same time resource includes a PSFCH occasion. Here, the CAPC value associated with the PSFCH transmission may be determined based on the traffic priority of the PSSCH corresponding to the PSFCH transmission. In addition, the traffic priority may be determined based on priority information within the SCI for scheduling the PSSCH.

Figure 22:
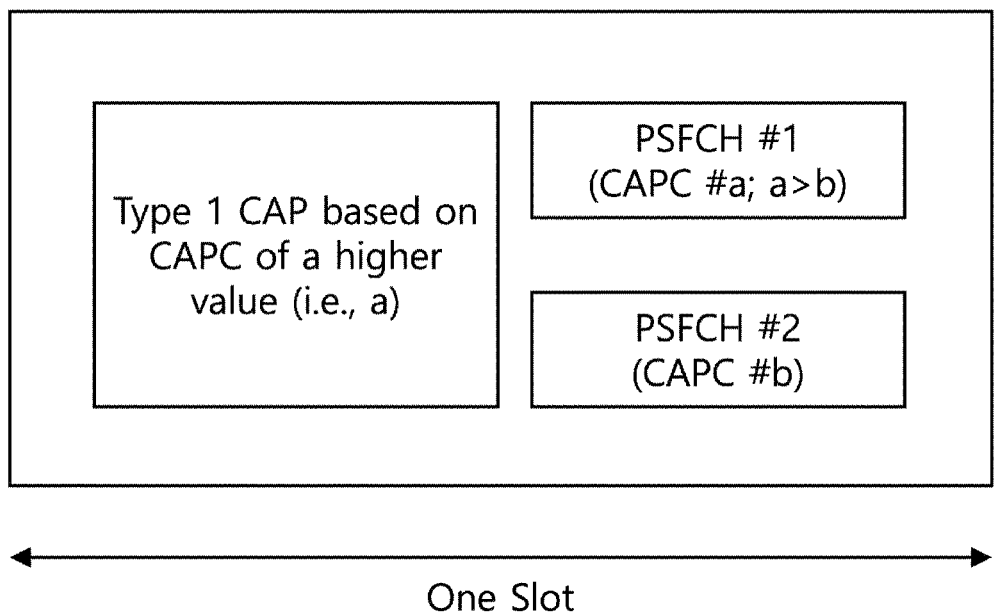

FIG. 22 illustrates a problem when performing a plurality of SL transmissions.

Referring to FIG. 22, a UE may receive PSCCH/PSSCH from a plurality of other UEs and then perform a process for performing a plurality of PSFCH transmissions within a slot. In this case, each CAPC value may be associated with each PSFCH transmission. For example, CAPC #a may be associated with PSFCH transmission #1 and CAPC #b may be associated with PSFCH transmission #2. The CAPC value associated with PSFCH transmission may be determined based on the priority of the PSFCH. The priority of the PSFCH follows the priority of the corresponding PSSCH, and the priority of the PSSCH may be determined based on the priority information in the SCI that schedules the PSSCH. For convenience, it is assumed that the value of CAPC #a is greater than CAPC #b. In this case, in order to transmit a plurality of SL transmissions within a slot, the UE may perform Type 1 CAP based on the highest CAPC value among a plurality of CAPC values associated with the plurality of SL transmissions. When the Type 1 CAP is successful, the UE may transmit a plurality of PSFCHs (to different UEs).

2. Method for Determining CAPC by a UE when Different UEs Transmit PSFCHs at the Same PSFCH Occasion, and the CAPC Values for PSFCHs Configured Independently of Each Other are Configured Differently When different UEs transmit PSFCHs to at the same PSFCH occasion, CAPC values for the PSFCH independently configured by different UEs may be configured differently. In this case, there may be a case where the transmission of another UE that performs backoff by setting the CW size relatively long (i.e., higher CAPC value=lower priority) may be affected by the transmission of a UE that succeeds in channel access by setting the CW size short (i.e., lower CAPC value=higher priority), and thus the PSFCH transmission of the UE may not occur. Therefore, a CAPC configuration method to resolve collisions that may occur during the channel access procedure (CAP) for PSFCH transmissions transmitted by at least two UEs that may occur in the same PSFCH occasion should be discussed.

If different UEs may know the traffic priority for the PSSCH corresponding to the PSFCH transmission at the same PSFCH occasion by decoding the SCI of the PSCCH, as a CAPC configuration method of two UEs to resolve collision that may occur during the channel access procedure (CAP) for PSFCH transmissions transmitted by two or more UEs, when performing Type 1 channel access for PSFCH transmissions, Type 1 channel access may be performed by configuring one CAPC value in common. If each UE performs PSFCH transmission based on the common CAPC value, the transmission of different UEs may be less affected when each of the different UEs transmit the PSFCH. Accordingly, it is possible to avoid PSFCH transmission failure due to PSFCH collision that may occur when the PSFCH transmission of each UE uses different channel access parameters of different UEs. As a method for configuring one CAPC value in common for PSFCH transmissions, the traffic priority for the PSSCH transmitted from different UEs may be known by decoding the SCI of the PSCCH, and when the CAPC for each PSFCH is configured according to the traffic priority for each PSSCH, the highest CAPC value (i.e., the lowest priority) among the CAPCs configured for each PSFCH may be configured as one common CAPC value. Accordingly, it is possible to perform a Type 1 channel access procedure before the start of the same PSFCH occasion configured for different UEs. If channel access is successful, transmission of each PSFCH transmitted by different UEs may be performed at the same start time point for PSFCH transmission configured for different UEs. Specifically, different UEs may perform channel access at the start time point for transmitting the same PSFCH, and the UE or UEs that succeed in channel access may perform PSFCH transmissions simultaneously. However, the UE that fails to succeed in channel access may drop transmission of the corresponding PSFCH, or may perform PSFCH transmission after attempting to perform the Type 1 channel access procedure at the next PSFCH occasion for PSFCH transmission or at a PSFCH occasion that may be additionally configured according to the channel access failure.

As another method, if different UEs cannot know the traffic priority to be used for PSFCH transmission in a PSFCH occasion, as a CAPC configuration method for resolving collisions between PSFCH transmissions transmitted by two or more UEs, a fixed value (e.g., lowest CAPC value=highest priority) may be configured to be used as the CAPC value for PSFCH transmission. This may be the least complex method for resolving PSFCH collisions between different UEs.

However, regardless of how the CAPC value is configured for the transmission of each PSFCH, the start time point of transmitting the PSFCH at least at the same PSFCH occasion may be configured to be cell-specific. Accordingly, the collision of PSFCHs transmitted by different UEs or transmitted from the same UE to different UEs may be basically minimized. Configuring the PSFCH transmission start time point at the PSFCH occasion cell-specifically may be applied to both the case where the same UE transmits two or more PSFCHs to different UEs and the case where different UEs transmit different PSFCHs.

Although the method and system of the present invention have been described in connection with specific embodiments, some or all of components or operations thereof may be implemented using a computing system having a general-purpose hardware architecture.

The description of the present invention described above is only exemplary, and it will be understood by those skilled in the art to which the present invention pertains that various modifications and changes can be made without changing the technical spirit or essential features of the present invention. Therefore, it should be construed that the embodiments described above are illustrative and not restrictive in all respects. For example, each component described as a single type may be implemented in a distributed manner, and similarly, components described as being distributed may also be implemented in a combined form.

The scope of the present invention is indicated by the attached claims rather than the detailed description, and it should be construed that all changes or modifications derived from the meaning and scope of the claims and their equivalents are included in the scope of the present invention.

The invention claimed is:

1. A user equipment (UE) configured to operate in a wireless communication system, the user equipment comprising:
 a communication module; and
 a processor controlling the communication module,
 wherein the processor is configured to:
 determine each channel access priority class (CAPC) value for each SL transmission for a plurality of sidelink (SL) transmissions within a slot; and
 perform a Type 1 channel access procedure (CAP) based on a highest CAPC value among a plurality of CAPC values associated with the plurality of SL transmissions for transmitting the plurality of SL transmissions in the slot.

2. The UE of claim 1, wherein the plurality of CAPC values are associated with each contention window (CW) parameter, and the higher the CAPC value, the lower the channel access priority of the CW parameter.

3. The UE of claim 1, wherein the processor is configured to transmit the plurality of SL transmissions to each corresponding receiving UE when the Type 1 CAP is successful.

4. The UE of claim 1, wherein the plurality of SL transmissions correspond to two or more receiving UEs.

5. The UE of claim 1, wherein the plurality of SL transmissions are scheduled to be transmitted on the same time resources within the slot.

6. The UE of claim 1, wherein the plurality of SL transmissions are scheduled to be transmitted on different frequency resources within the slot.

7. The UE of claim 6, wherein the plurality of SL transmissions comprise multiple PSFCH transmissions on the different frequency resources within the slot, and
 wherein a cell-specifically configured starting time position of PSFCH transmission is applied for the multiple PSFCH transmissions in the slot.

8. The UE of claim 1, wherein the plurality of SL transmissions comprise a physical sidelink feedback channel (PSFCH) transmission.

9. The UE of claim 8, wherein the CAPC value associated with SL transmission including the PSFCH transmission is fixed as a lowest CAPC value.

10. The UE of claim 9, wherein the CAPC value associated with the PSFCH transmission is determined based on the traffic priority of the physical sidelink shared channel (PSSCH) corresponding to the PSFCH transmission, and the traffic priority is determined based on a priority information within a sidelink control information (SCI) that schedules the PSSCH.

11. A method performed by a user equipment (UE) in a wireless communication system, the method comprising:
 determining each channel access priority class (CAPC) value for each SL transmission for a plurality of sidelink (SL) transmissions within a slot; and
 performing a Type 1 channel access procedure (CAP) based on a highest CAPC value among a plurality of CAPC values associated with the plurality of SL transmissions for transmitting the plurality of SL transmissions in the slot.

12. The method of claim 11, wherein the plurality of CAPC values are associated with each contention window (CW) parameter, and the higher the CAPC value, the lower the channel access priority of the CW parameter.

13. The method of claim 11, further comprising transmitting the plurality of SL transmissions to each corresponding receiving UE when the Type 1 CAP is successful.

14. The method of claim 11, wherein the plurality of SL transmissions correspond to two or more receiving UEs.

15. The method of claim 11, wherein the plurality of SL transmissions are scheduled to be transmitted on the same time resources within the slot.

16. The method of claim 11, wherein the plurality of SL transmissions are scheduled to be transmitted on different frequency resources within the slot.

17. The method of claim 16, wherein the plurality of SL transmissions comprise multiple PSFCH transmissions on the different frequency resources within the slot, and
 wherein a cell-specifically configured starting time position of PSFCH transmission is applied for the multiple PSFCH transmissions in the slot.

18. The method of claim 11, wherein the plurality of SL transmissions comprise a physical sidelink feedback channel (PSFCH) transmission.

19. The method of claim 18, wherein the CAPC value associated with SL transmission including the PSFCH transmission is fixed as a lowest CAPC value.

20. The method of claim 19, wherein the CAPC value associated with the PSFCH transmission is determined based on the traffic priority of the physical sidelink shared channel (PSSCH) corresponding to the PSFCH transmission, and the traffic priority is determined based on a priority information within a sidelink control information (SCI) that schedules the PSSCH.

* * * * *